US012664945B2

(12) United States Patent
Kim et al.

(10) Patent No.: US 12,664,945 B2
(45) Date of Patent: Jun. 23, 2026

(54) DISPLAY DEVICE REDUCING ELECTROMAGNETIC INTERFERENCE (EMI) NOISE ON DISPLAY PANEL

(71) Applicant: LG Display Co., Ltd., Seoul (KR)

(72) Inventors: Donghwan Kim, Paju-si (KR); Jaekwon Chae, Paju-si (KR); Eunsup Yoon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/893,682

(22) Filed: Sep. 23, 2024

(65) Prior Publication Data

US 2025/0174200 A1 May 29, 2025

(30) Foreign Application Priority Data

Nov. 27, 2023 (KR) ........................ 10-2023-0167063

(51) Int. Cl.
*G09G 3/3233* (2016.01)
*G09G 3/3266* (2016.01)
(Continued)

(52) U.S. Cl.
CPC ......... *G09G 3/3266* (2013.01); *G09G 3/3233* (2013.01); *G09G 3/32* (2013.01);
(Continued)

(58) Field of Classification Search
CPC .......... G09G 3/30; G09G 3/32; G09G 3/3208; G09G 3/3216; G09G 3/3225; G09G 3/3233; G09G 3/3241; G09G 3/325; G09G 3/3258; G09G 3/3266; G09G 3/3275; G09G 3/3283; G09G 3/3291; G09G 3/36; G09G 3/3611; G09G 3/3614; G09G 3/3622; G09G 3/3625; G09G 3/364; G09G 3/3644; G09G 3/3655; G09G 3/3659; G09G 3/3674; G09G 3/3677; G09G 3/3681; G09G 3/3685; G09G 3/3688; G09G 3/3692; G09G 3/3696; G09G 2310/0289
(Continued)

(56) References Cited

U.S. PATENT DOCUMENTS 12,518,716 B2 * 1/2026 Kim ..................... G09G 3/3677
2005/0012706 A1 * 1/2005 Murade .................. G09G 5/006
345/99
(Continued)

FOREIGN PATENT DOCUMENTS

KR 10-2021-0082824 A 7/2021

*Primary Examiner* — Ke Xiao
*Assistant Examiner* — Nelson Lam
(74) *Attorney, Agent, or Firm* — Fenwick & West LLP

(57) ABSTRACT

A display device is disclosed that includes a display panel including a display area in which pixels are disposed and a non-display area surrounding the display area, a level shifter disposed at at least one side of the non-display area and configured to generate a gate clock signal and an inverted signal having and a phase opposite to that of the gate clock signal, a control signal line configured to transmit the gate clock signal output from the level shifter to the pixels, and an inverted signal line configured to receive the inverted signal from the level shifter, wherein the inverted signal line is disposed in a closed loop shape surrounding the display area in the non-display area.

16 Claims, 16 Drawing Sheets

(51) Int. Cl.
*G09G 3/32* (2016.01)
*G09G 3/36* (2006.01)

(52) U.S. Cl.
CPC ... *G09G 3/3677* (2013.01); *G09G 2300/0413* (2013.01); *G09G 2300/0842* (2013.01); *G09G 2310/0286* (2013.01); *G09G 2310/0289* (2013.01); *G09G 2310/08* (2013.01); *G09G 2330/06* (2013.01)

(58) Field of Classification Search
USPC ........................................ 345/76–83, 87–104
See application file for complete search history.

(56) References Cited

U.S. PATENT DOCUMENTS

| | | | | |
|---|---|---|---|---|
| 2005/0104647 | A1* | 5/2005 | Choi | G06F 1/04<br>327/333 |
| 2007/0115235 | A1* | 5/2007 | Park | G09G 3/3611<br>345/93 |
| 2007/0296682 | A1* | 12/2007 | Hwang | G09G 3/3677<br>345/100 |
| 2009/0273550 | A1* | 11/2009 | Vieri | G09G 3/3648<br>345/87 |
| 2014/0009460 | A1* | 1/2014 | Nakamura | G09G 3/34<br>345/87 |
| 2017/0162123 | A1* | 6/2017 | Choi | G09G 3/3291 |
| 2018/0122326 | A1* | 5/2018 | Seo | G09G 3/3266 |
| 2019/0259350 | A1* | 8/2019 | Jeon | G09G 3/3692 |

* cited by examiner

DISPLAY DEVICE REDUCING ELECTROMAGNETIC INTERFERENCE (EMI) NOISE ON DISPLAY PANEL

CROSS REFERENCE TO RELATED APPLICATION

The present application claims priority to Republic of Korea Patent Application No. 10-2023-0167063, filed Nov. 27, 2023, which is hereby incorporated by reference in its entirety.

BACKGROUND

Field of Technology

The present disclosure relates to a display device, and more specifically, to a display device in which electromagnetic interference (EMI) is prevented by increasing the cancel out efficiency between a gate signal and an inverted signal that are applied to a display panel.

Description of the Related Art

In general, display devices each includes a display panel on which pixels are disposed, a gate driver for supplying gate signals to the pixels through gate lines, a data driver for applying data signals to the pixels through data lines, and a timing controller for controlling operations of the gate driver and the data driver.

In the case of a display device having a large area/high resolution, the number of control signals applied from the timing controller to the gate driver and/or the data driver increases. In particular, when signals are transmitted through a large number of control signal lines in a small area to implement a narrow bezel, noise due to electromagnetic interference (EMI) between the signals increases. The noise may be greatly generated by a gate clock signal applied in the form of a square wave.

SUMMARY

Embodiments are directed to providing a display device in which noise on a display panel is reduced using a field cancel technology through an inverted signal.

The embodiments are also directed to providing a display device in which an inverted signal line to which the inverted signal is applied is formed in the same closed loop shape as a signal line to which an original signal is applied.

The embodiments are also directed to providing a display device in which a load difference between the signal line to which the original signal is applied and the inverted signal line is reduced by connecting the inverted signal line to which the inverted signal is applied to a dummy pixel.

A display device according to one embodiment may include a display panel including a display area in which pixels are disposed and a non-display area surrounding the display area, a level shifter disposed at at least one side of the non-display area and configured to generate a gate clock signal and an inverted signal having an a phase opposite to that of the gate clock signal, a control signal line configured to transmit the gate clock signal output from the level shifter to the pixels, and an inverted signal line configured to receive the inverted signal from the level shifter, wherein the inverted signal line may be disposed in a closed loop shape surrounding the display area in the non-display area.

The display device may further include a gate driver configured to output gate signals to the pixels in response to the gate clock signal.

The gate driver may receive the gate clock signal through a gate control line and outputs the gate signal through a gate line, and the control signal line may include the gate control line and the gate line.

The display device may further include dummy pixels disposed in the non-display area and connected to the inverted signal line.

The dummy pixels may be disposed at the other side of the display panel opposite to the level shifter.

The dummy pixels may be disposed at one side of the display panel facing the level shifter.

The dummy pixels may be configured as the same number and the same type of circuit elements as the pixels.

Each of the dummy pixels may include a dummy light emission control circuit including a dummy light emitting element and at least one circuit element configured to control light emission of the dummy light emitting element, and a dummy switching transistor having a gate electrode connected to the inverted signal line and a source electrode and a drain electrode electrically shorted.

The dummy light emission control circuit may include the dummy light emitting element formed of a dummy liquid crystal cell connected between the dummy switching transistor and a common electrode. The dummy storage capacitor connected between the dummy liquid crystal cell and the common electrode, and the dummy switching transistor may be connected between the dummy liquid crystal cell and the common electrode.

The display device may further include one or more switching elements connected to the inverted signal line and configured to open and close the inverted signal line.

The one or more switching elements may be disposed between the dummy pixels at a predetermined interval.

The dummy pixels may be grouped into a plurality of dummy pixel groups each including the same or different number of dummy pixels, and the one or more switching elements may each be disposed between the dummy pixel groups.

The gate driver may be composed of stage circuits configured to receive a gate start signal or a carry signal output from a previous stage and the gate clock signal and output the gate signal to one or more corresponding pixel rows.

The one or more switching elements may be configured to be turned off according to the carry signal output from the corresponding stage circuit to open the inverted signal line.

The display panel may be divided into a plurality of display blocks each including one or more pixel rows, and the one or more switching elements may be configured to receive the carry signal from a stage circuit connected to a last pixel row of the corresponding display block.

The display device may further include a reset transistor having one electrode connected to a gate-on voltage and a gate electrode configured to receive the gate start signal, a first node that receives the carry signal from the stage circuit connected to a last pixel row of a first display block, a control transistor diode-connected between the other electrode of the reset transistor and the first node, and a capacitor connected between the first node and a ground voltage.

The one or more switching elements may be configured as a first switching element having source and drain electrodes connected to the inverted signal line between a first dummy pixel group and a second dummy pixel group and a gate electrode connected to the first node.

The first switching element may be turned on in response to the gate-on voltage applied to the first node through the reset transistor and the control transistor and turned off in response to a carry signal at a gate-off level applied to the first node to electrically separate the second dummy pixel group from the inverted signal line.

DETAILED DESCRIPTION

Figure 1:
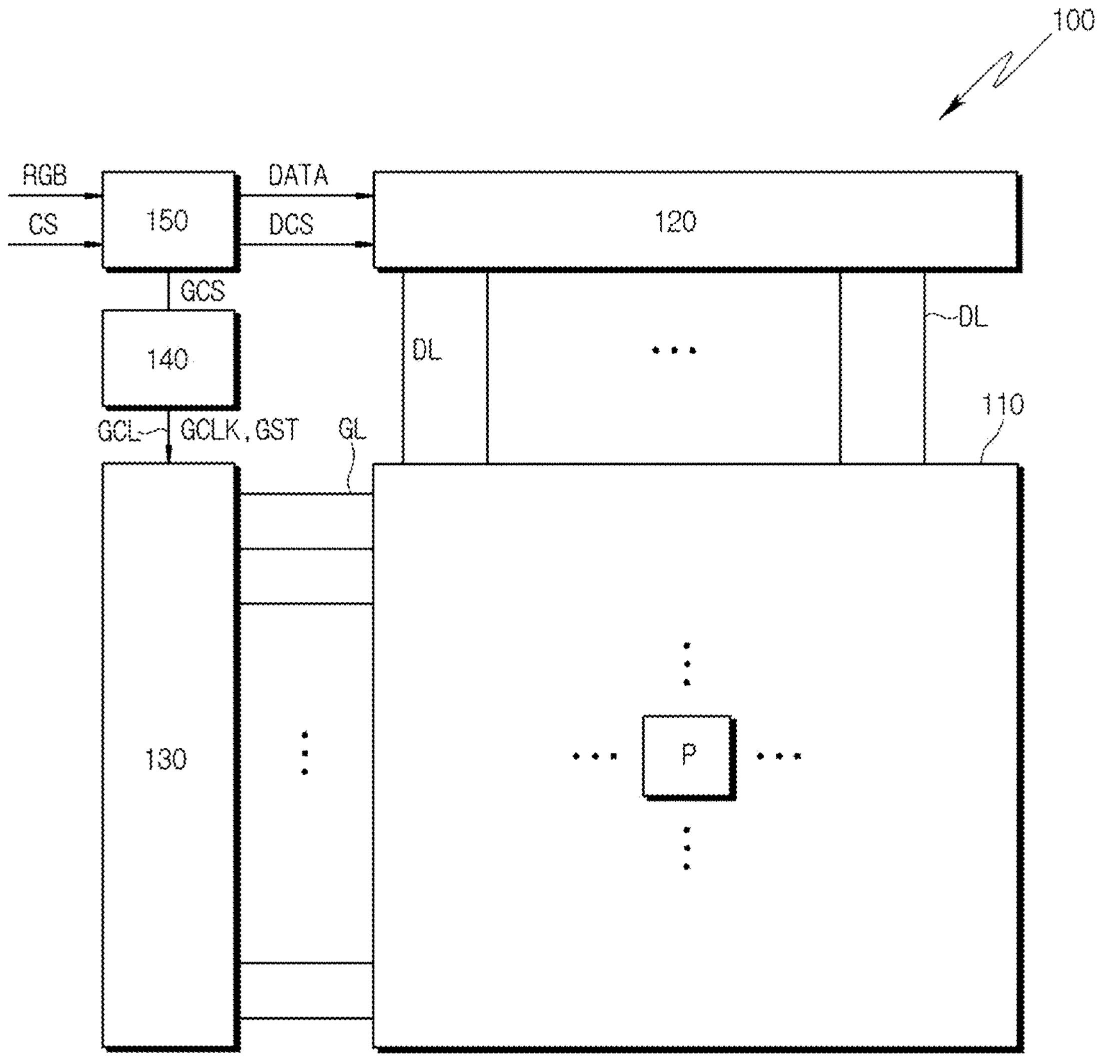
FIG. 1 is a block diagram schematically showing a structure of a display device according to one embodiment.

Hereinafter, embodiments will be described with reference to the accompanying drawings. In the specification, when a first component (or an area, a layer, a portion, or the like) is described as “on,” “connected,” or “coupled to” a second component, it means that the first component may be directly connected/coupled to the second component or a third component may be disposed therebetween.

The same reference numerals indicate the same components. In addition, in the drawings, thicknesses, proportions, and dimensions of components are exaggerated for effective description of technical contents. The term “and/or” includes all one or more combinations that may be defined by the associated configurations.

Terms such as first and second may be used to describe various components, but the components are not limited by the terms. The terms are used only for the purpose of distinguishing one component from another. For example, a first component may be referred to as a second component, and similarly, the second component may also be referred to as the first component without departing from the scopes of the embodiments. The singular expression includes the plural expression unless the context clearly dictates otherwise.

Terms such as “under,” “at a lower side,” “above,” and “at an upper side” are used to describe the relationship between the components illustrated in the drawings. The terms are relative concepts and are described with respect to directions marked in the drawings.

It should be understood that term such as “includes” or “has” is intended to specify the presence of features, numbers, steps, operations, components, parts, or a combination thereof described in the specification and does not preclude the presence or addition possibility of one or more other features, numbers, steps, operations, components, parts, or combinations thereof in advance.

FIG. 1 is a block diagram schematically showing a structure of a display device according to one embodiment.

Referring to FIG. 1, a display device 100 according to one embodiment may include a display panel 110 and a driving unit for driving the display panel 110. The driving unit may include a data driver 120, a gate driver 130, a level shifter 140, etc., and further include a timing controller 150 for controlling the data driver 120 and the gate driver 130.

The display panel 110 includes data lines DL, gate lines GL that intersect the data lines DL, and an array of pixels defined in an intersection areas of the data lines DL and the gate lines GL.

Each pixel P may include transistors connected to the corresponding data line DL and gate line GL, a storage capacitor, and a light emitting element connected to the data lines DL, the gate lines GL, and the storage capacitor. Each pixel P may emit light in response to the amount of current flowing through the light emitting element under the control of transistors.

The timing controller 150 may perform overall control functions related to driving the display panel 110 and control operations of the data driver 120 and the gate driver 130. The timing controller 150 receives an image signal RGB and a timing signal CS transmitted from an external system (not shown) and generates a data control signal DCS and a gate control signal GCS. The timing signal CS may include a data enable signal, a horizontal synchronization signal, a vertical synchronization signal, a clock signal, etc. The data control signal DCS is output to the data driver 120, and the gate control signal GCS is output to the level shifter 140. The timing controller 150 generates digital image data DATA from the image signal transmitted from the external system and outputs the digital image data DATA to the data driver 120.

The level shifter 140 may convert the gate control signal GCS input from the timing controller 150 at a digital signal voltage level into a signal at an analog voltage level. For example, the level shifter 140 converts a high logic voltage into a gate high voltage and converts a low logic voltage (or a low potential input voltage) into a gate low voltage. Therefore, the level shifter 140 may generate a gate clock signal GCLK and a gate start signal GST from the gate control signal GCS received from the timing controller 150 and output the gate clock signal GCLK and the gate start signal GST to the gate control line GCL.

The data driver 120 converts the digital image data DATA into an analog data voltage according to the data control signal DCS. The data driver 120 may apply the analog data voltage to the corresponding pixels P through the data line DL. In one embodiment, a multiplexer (not shown) may be disposed between the data driver 120 and the data lines DL. The multiplexer may distribute the data voltage input from the data driver 120 to the data lines DL under the control of the timing controller 150.

The gate driver 130 may sequentially output the gate signals by one horizontal period through the gate line GL in response to the gate clock signal GCLK and the gate start signal GST input from the level shifter 140. For example, the gate driver 130 may provide the gate signals to the gate lines GL by sequentially outputting one or more gate clock signals GCLK to the gate lines GL at a predetermined controlled timing. A pixel row connected to each gate line GL may be turned on by one horizontal period in response to the gate signal.

The display device 100 according to one embodiment may be a display device including a backlight unit such as a light crystal display (LCD) device and may be a self-luminous display device, such as an organic liquid emitting diode (OLED) display device, a quantum dot display device, and a micro light emitting diode (LED) display device.

When the display device 100 is the OLED display device, each pixel P may include an OLED that emits light by itself as a light emitting element. When the display device 100 is the quantum dot display device, each pixel P may include a light emitting element formed of quantum dots that are semiconductor crystals that emit light by themselves. When the display device 100 is the micro-LED display device, each pixel P may include micro LEDs, which emit light by themselves and are made of an inorganic material, as a light emitting element. When the display device 100 is a nano LED display device, each pixel P may include nano LEDs, which emit light by themselves and are made of inorganic material, as a light emitting element.

Figure 2:
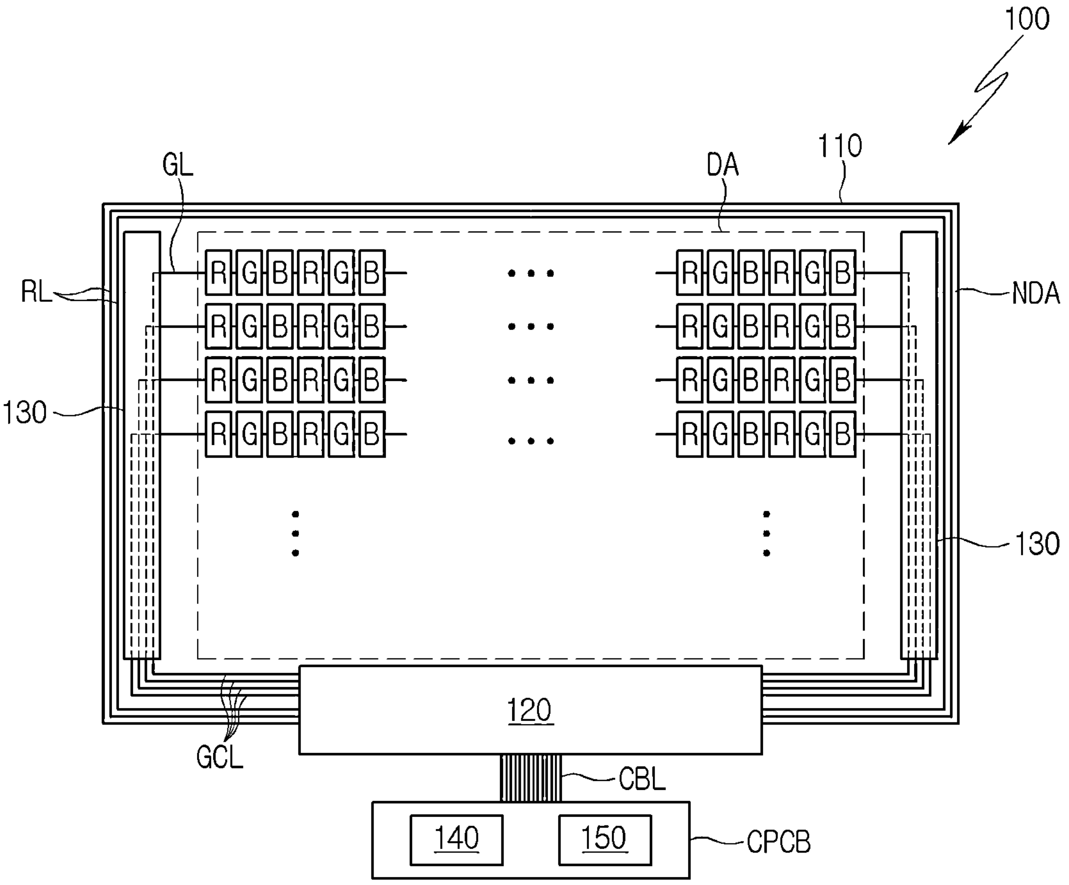
FIG. 2 is a schematic plan view of a display device according to a first embodiment.

FIG. 2 is a schematic plan view of a display device according to a first embodiment.

Referring to FIG. 2, the display panel 110 may include a display area DA in which images are displayed and a non-display area NDA in which the images are not displayed near the display area DA.

The display area DA includes the data lines DL (see FIG. 1), the gate lines GL that intersect the data lines DL, and the array of pixels P (see FIG. 1) defined in intersection areas of the data lines DL and the gate lines GL.

The pixels P disposed in the display area DA may include red (R), green (G), and blue (B) pixels for color implementation. The pixels P may further include white pixels in addition to the RGB pixels. However, the present embodiment is not limited thereto, and the pixels P may include cyan, magenta, and yellow pixels.

At least some of the drivers may be mounted on or connected to the non-display area NDA. For example, the data driver 120 may be connected to one side of the non-display area NDA, and the gate driver 130 may be mounted at one side of the non-display area NDA.

The data driver 120 may be composed of one or more driver integrated circuits DIC. The driver integrated circuit may include a shift registers, a latch circuit, a digital-to-analog converter, an output buffer, etc. The driver integrated circuit may further include an analog-to-digital converter.

The driver integrated circuit may be connected to the display panel 110 in a tape automated bonding (TAB) type, connected to a bonding pad of the display panel 110 in a chip on glass (COG) type or a chip on panel (GOP) type, or connected to the display panel 110 in a chip on film (COF) type. In this case, the driver integrated circuit may be mounted on a circuit film connected to the non-display area NDA of the display panel 110.

The data driver 120 may be connected to one side (e.g., the upper or lower side) of the display panel 110 as shown. According to a driving method, a panel design method, etc., the data driver 120 may be connected to both sides (e.g., upper and lower sides) of the display panel 110 or connected to two or more of four side surfaces of the display panel 110.

The gate driver 130 may be composed of stage circuits connected one-to-one to the plurality of gate lines GL. The gate driver 130 may be configured in a gate in panel type mounted on the non-display area NDA of the display panel 110.

The gate driver 130 may be disposed at one side of the display panel 110 or both sides (e.g., left and right sides) of the display panel 110 as shown. According to a driving method, a panel design method, etc., the gate driver 130 may be disposed at both sides (e.g., left and right sides) of the display panel 110 as shown or connected to two or more of four side surfaces of the display panel 110.

In one embodiment, one or more inverted signal lines RL may be disposed in the non-display area NDA. The inverted signal line RL is configured to receive an inverted signal of a predetermined original signal. For example, the inverted signal line RL may receive the inverted signal having an anti-phase of the gate clock signal GCLK (see FIG. 1).

The inverted signal line RL may be disposed adjacent to a control signal line to which the original signal is applied and may have substantially the same shape as the control signal line. For example, the control signal line may include a gate control line GCL to which the gate clock signal GCLK is applied, and a gate line GL to which the gate clock signal GCLK is provided as a gate signal. In the present embodiment, the inverted signal line RL may be disposed adjacent to the gate control line GCL and the gate line GL.

As shown, in an embodiment in which the gate driver 130 is disposed at both sides of the display panel 110, the gate control line GCL and the gate line GL may form a closed loop. In the present embodiment, the inverted signal line RL may be disposed along an edge of the display panel 110 in the non-display area NDA and disposed in a closed loop shape surrounding the display area DA.

The inverted signal line RL may be formed to have the same material and/or the same electrical characteristics as the control signal line to which the original signal is applied. In FIG. 2, an example in which two inverted signal lines RL are disposed in the non-display area NDA is shown, but the present embodiment is not limited thereto.

The display device 100 may include a control printed circuit board CPCB for mounting control components and various electrical devices.

The level shifter 140 and the timing controller 150 may be mounted on the control printed circuit board CPCB. The level shifter 140 and the timing controller 150 may be implemented as various circuits or electronic components, such as an integrated circuit (IC), a field programmable gate array (FPGA), an application specific integrated circuit (ASIC), and a processor.

The control printed circuit board CPCB may be electrically connected to the circuit film on which the driver integrated circuit is mounted, etc., through at least one connection cable CBL. Here, the connection cable CBL may be, for example, a flexible printed circuit (FPC), a flexible flat cable (FFC), etc.

The level shifter 140 may be connected to the gate driver 130 through the gate control line GCL. The level shifter 140 may output a gate clock signal GCLK, a gate start signal GST (see FIG. 1), etc. to the gate driver 130 through the gate control line GCL.

In one embodiment, the level shifter 140 may be further connected to the inverted signal line RL. The level shifter 140 may output a predetermined inverted signal through the inverted signal line RL. For example, the level shifter 140 may apply an inverted signal having a phase opposite to that of the gate clock signal GCLK applied to the gate control line GCL.

Hereinafter, waveforms of the original signal and the inverted signal applied to the control signal line and the inverted signal line RL, respectively will be described in detail.

Figure 3:
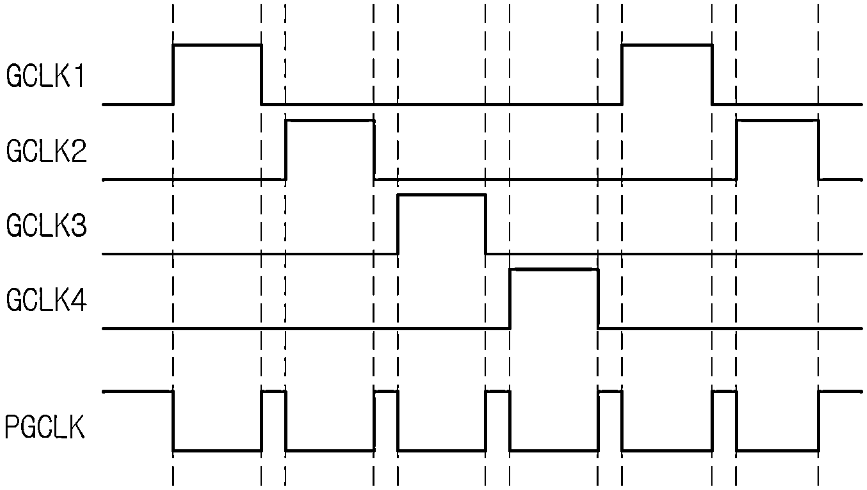
FIG. 3 is a waveform diagram of signals applied to a signal line and an inverted signal line of FIG. 2 according to one embodiment.

FIG. 3 is a waveform diagram of signals applied to a signal line and an inverted signal line of FIG. 2 according to one embodiment. Specifically, FIG. 3 shows gate clock signals GCLK1 to GCLK4 applied to the gate control line GCL (see FIG. 2) and an inverted signal PGCLK applied to the inverted signal line RL (see FIG. 2).

The gate clock signals GCLK1 to GCLK4 may be alternately applied to the stage circuits constituting the gate driver 130 (see FIG. 2). The gate clock signals GCLK1 to GCLK4 may be square wave signals (pulse signals) in which on and off voltages are repeated. In this case, lengths (pulse widths) of turn-on voltages of the gate clock signals GCLK1 to GCLK4 may be about 1H (1 horizontal period) or smaller than 1H.

The gate clock signals GCLK1 to GCLK4 may have the same waveform and may be phase-shifted signals. For example, the second gate clock signal GCLK2 may be a signal having the same waveform as the first clock signal GCLK1 and a phase shifted (phase delayed) at a predetermined interval (about 1H), the third gate clock signal GCLK3 may be a signal having the same waveform as the second clock signal GCLK2 and a phase shifted (phase delayed) at a predetermined interval (about 1H), and the fourth gate clock signal GCLK4 may be a signal having the same waveform as the third clock signal GCLK3 and a phase shifted (phase delayed) at a predetermined interval (about 1H).

The inverted signal PGCLK may be a signal having a phase (phase of 180 degrees) opposite to that of the gate clock signals GCLK1 to GCLK4. For example, the inverted signal PGCLK may be composed of a plurality of inverted clock signals each having a phase inverted with respect to each of the gate clock signals GCLK1 to GCLK4. Alternatively, the inverted signal PGCLK may be composed of one inverted clock signal having a phase inverted with respect to the sum signal of the gate clock signals GCLK1 to GCLK4 as shown. Alternatively, the inverted signal PGCLK may be composed of one or more inverted clock signals each having a phase inverted with respect to the sum signal of at least two gate clock signals GCLK1 to GCLK4.

Since the gate clock signals GCLK1 to GCLK4 are square wave signals that cause EMI, when the potential is inverted, a peak current is generated on the gate control line GCL, resulting in EMI. In this case, when the inverted signal PGCLK having the anti-phase of the gate clock signals GCLK1 to GCLK4 is output, an electromagnetic field of the inverted signal PGCLK cancels or compensates an electromagnetic field of a peak current, thereby minimizing, reducing, or eliminating EMI.

In the embodiment shown in FIG. 2, the inverted signal line RL to which the inverted signal PGCLK is applied has a closed loop shape surrounding the display area DA and has a shape that is the same as or similar to a closed loop formed by the gate control line GCL to which the gate clock signals GCLK1 to GCLK4 are applied and the gate line GL connected to the gate control line GCL. Such a type of inverted signal line RL has a length that is more approximate to the signal line to which the original signal is applied than when the inverted signal line RL has a bar structure that is opened at a predetermined location. As a length deviation between the signal line of the original signal and the inverted signal line RL is reduced, a deviation of electromagnetic field radiation generated from the two lines can be reduced, and as a result, it is possible to increase the field cancel efficiency and reduce the EMI.

Figure 4:
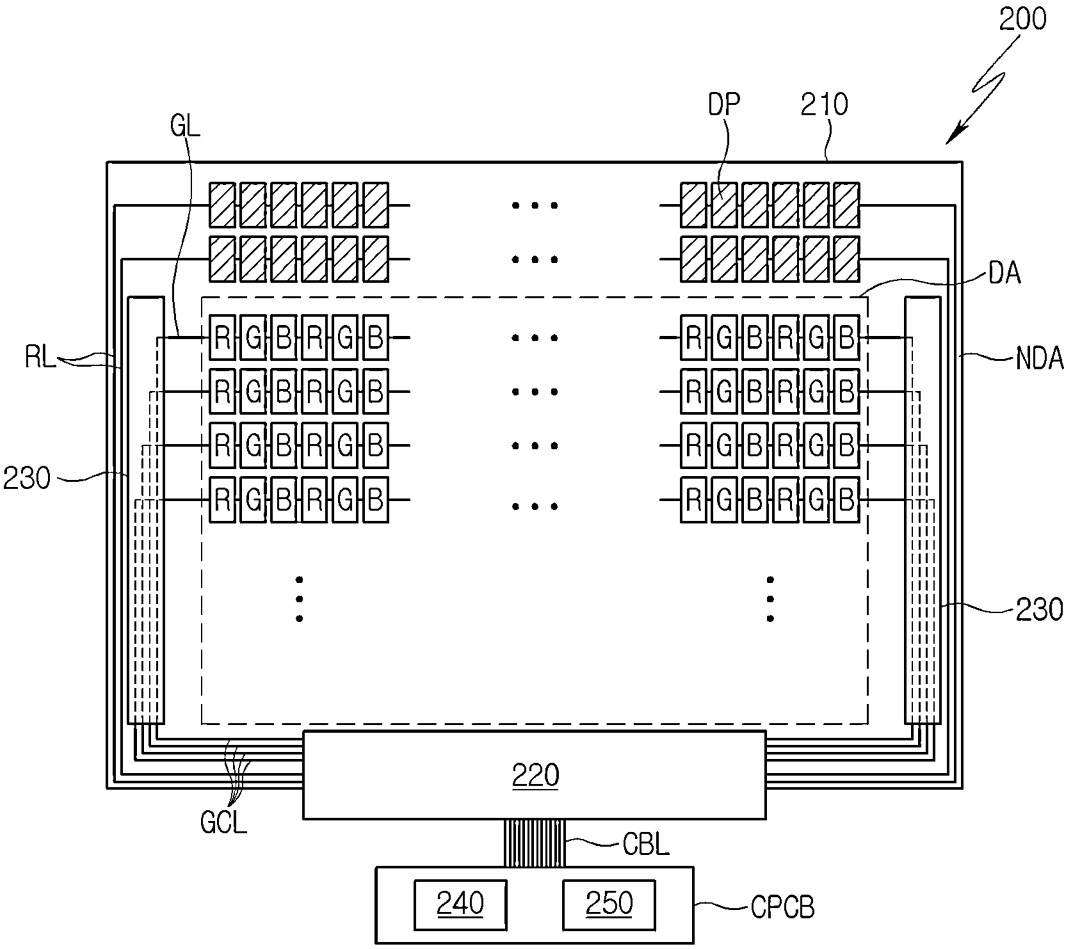
FIG. 4 is a schematic plan view of a display device according to a second embodiment.

FIG. 4 is a plan view of a display device according to a second embodiment.

Referring to FIG. 4, a display panel 210 may include a display area DA in which images are displayed and a non-display area NDA in which the images are not displayed near the display area DA.

The display area DA includes the data lines DL (see FIG. 1), the gate lines GL that intersect the data lines DL, and the array of pixels P (see FIG. 1) defined in intersection areas of the data lines DL and the gate lines GL.

At least some of the drivers may be mounted on or connected to the non-display area NDA. For example, a data driver 220 may be connected to one side of the non-display area NDA, and a gate driver 230 may be mounted at one side of the non-display area NDA.

In one embodiment, one or more inverted signal lines RL may be disposed in the non-display area NDA. The inverted signal line RL is configured to receive an inverted signal of a predetermined original signal. For example, the inverted signal line RL may receive the inverted signal having an anti-phase of the gate clock signal GCLK.

The inverted signal line RL may be disposed adjacent to a control signal line to which the original signal is applied and may have substantially the same shape as the control signal line. For example, the inverted signal line RL may include the gate control line GCL to which the gate clock signal GCLK is applied, and the gate line GL to which the gate clock signal GCLK is provided as a gate signal. As shown, in an embodiment in which the gate driver 230 is disposed at both sides of the display panel 210, the gate control line GCL and the gate line GL may form a closed loop. In the present embodiment, the inverted signal line RL may be disposed along an edge of the display panel 210 in the non-display area NDA and disposed in a closed loop shape surrounding the display area DA.

The inverted signal line RL may be formed to have the same material and/or the same electrical characteristics as the control signal line to which the original signal is applied. In FIG. 4, an example in which two inverted signal lines RL are disposed in the non-display area NDA is shown, but the present embodiment is not limited thereto.

The non-display area NDA further includes an array of dummy pixels DP connected to the inverted signal line RL. The dummy pixels DP may have the same arrangement as the pixels P disposed in the display area DA. For example, the dummy pixels DP may be aligned in a generally straight line with adjacent pixels P in row and column directions. The number of pixels P disposed in one pixel row may be equal to the number of dummy pixels DP disposed in one dummy pixel row. However, the present embodiment is not limited thereto.

In one embodiment, the dummy pixels DP may be disposed at one side at which the driving unit (e.g., the data driver 220, the gate driver 230, a level shifter 240, and a timing controller 250) is not disposed. In the shown embodiment, the dummy pixels DP are disposed at one side opposite to the level shifter 240 and the timing controller 250 and disposed away from the level shifter 240 and the timing controller 250. However, the present embodiment is not limited thereto.

At least some of the drivers may be mounted on or connected to the non-display area NDA. For example, the data driver 220 may be connected to one side of the non-display area NDA, and the gate driver 230 may be mounted at one side of the non-display area NDA.

A display device 200 may include a control printed circuit board CPCB for mounting control components and various electrical devices.

The level shifter 240 and the timing controller 250 may be mounted on the control printed circuit board CPCB.

The level shifter 240 may be connected to the gate driver 230 through the gate control line GCL. The level shifter 240 may output the gate clock signal GCLK, the gate start signal GST, etc. to the gate driver 230 through the gate control line GCL.

In one embodiment, the level shifter 240 may be further connected to the inverted signal line RL. The level shifter 240 may output a predetermined inverted signal through the inverted signal line RL. For example, the level shifter 240 may apply an inverted signal having a phase opposite to that of the gate clock signal GCLK applied to the gate control line GCL.

Figure 5:
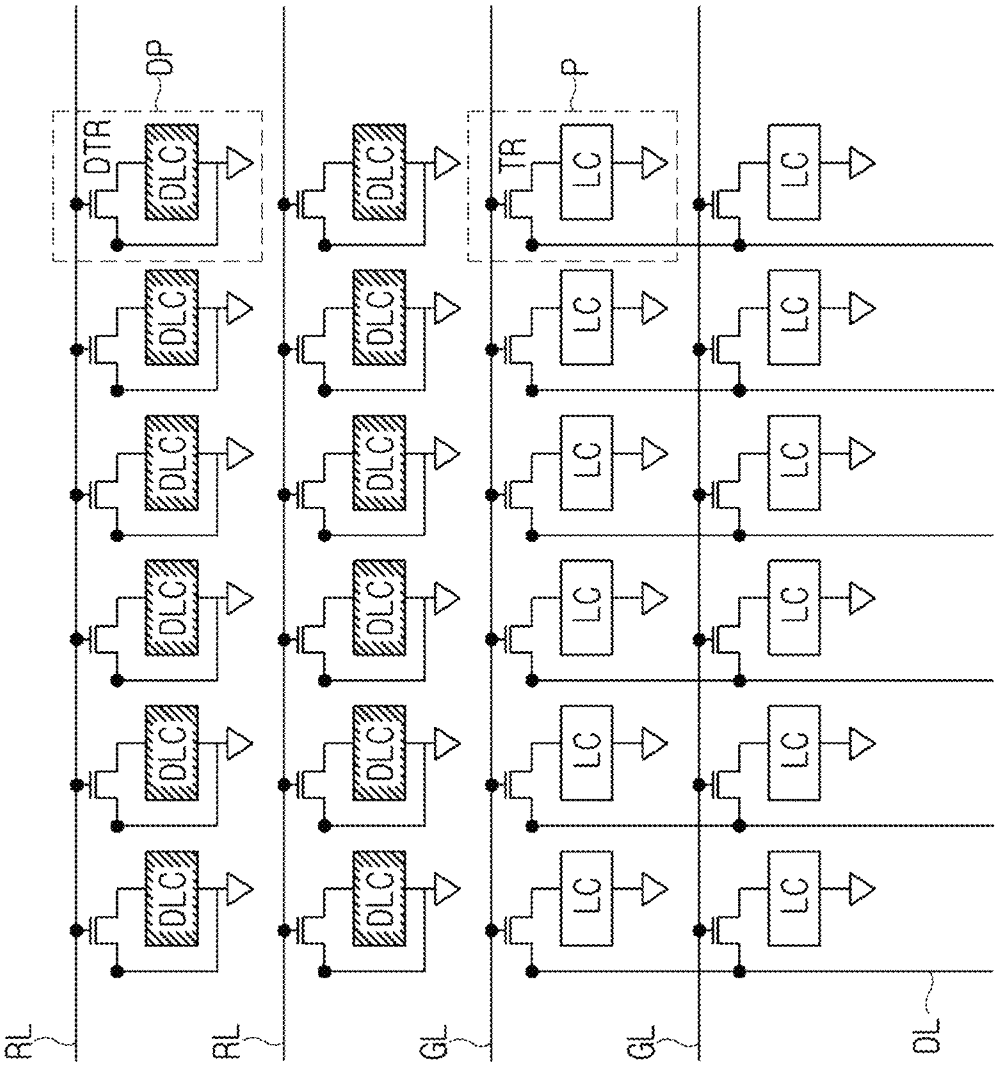
FIG. 5 is an enlarged view of a portion of the display device shown in FIG. 4 according to one embodiment.

FIG. 5 is an enlarged view of a portion of the display device shown in FIG. 4 according to one embodiment. Specifically, FIG. 5 shows portions of pixels P connected to the gate line GL in the display area DA and dummy pixels DP connected to the inverted signal line RL in the non-display area NDA.

Referring to FIG. 5, the pixel P may include at least one switching transistor TR and a light emission control circuit LC. The light emission control circuit LC may include, for example, a light emitting element, a driving transistor for controlling light emission of the light emitting element, at least one capacitor, a compensation circuit, etc. The light emitting element may be, for example, a liquid crystal cell, an organic light emitting diode, a micro-LED, etc.

The switching transistor TR of the pixel P may have a gate electrode connected to the gate line GL, one electrode connected to the light emission control circuit LC, and the other electrode connected to the data line DL. The switching transistor TR is turned on according to a gate signal at a gate-on level (e.g., a gate low voltage) applied to the gate line GL and transmits a data voltage applied to the data line DL to the light emission control circuit LC. The light emitting element provided in the light emission control circuit LC may be controlled to emit light with a luminance corresponding to the data voltage.

The dummy pixel DP may include at least one dummy switching transistor DTR and a dummy light emission control circuit DLC. The dummy light emission control circuit DLC may include, for example, a light emitting element, a driving transistor for controlling light emission of the light emitting element, at least one capacitor, a compensation circuit, etc. The light emitting element may be, for example, a liquid crystal cell, an organic light emitting diode, a micro-LED, etc.

In this case, the dummy light emission control circuit DLC of the dummy pixel DP and the light emission control circuit LC of the pixel P may be composed of the same number and type of circuit elements. Therefore, it is possible to minimize or at least reduce a load deviation between the inverted signal line RL connected to the dummy pixel DP and the gate control line GCL (see FIG. 4) and the gate line GL directly or indirectly connected to the pixel P.

The dummy switching transistor DTR of the dummy pixel DP may have a gate electrode connected to the inverted signal line RL and one electrode connected to the dummy light emission control circuit DLC. Compared to the pixel P, the other electrode of the dummy switching transistor DTR is connected to a common voltage instead of being connected to the data line DL. In other words, the dummy switching transistor DTR of the dummy pixel DP has a structure in which a source electrode and a drain electrode are electrically shorted. Therefore, while the pixel P is driven, the dummy pixel DP is configured to output substantially black light to prevent the interference with displaying images.

Specific circuit configurations of the pixel P and the dummy pixel DP will be described below with reference to FIGS. 6 and 7.

Figure 6:
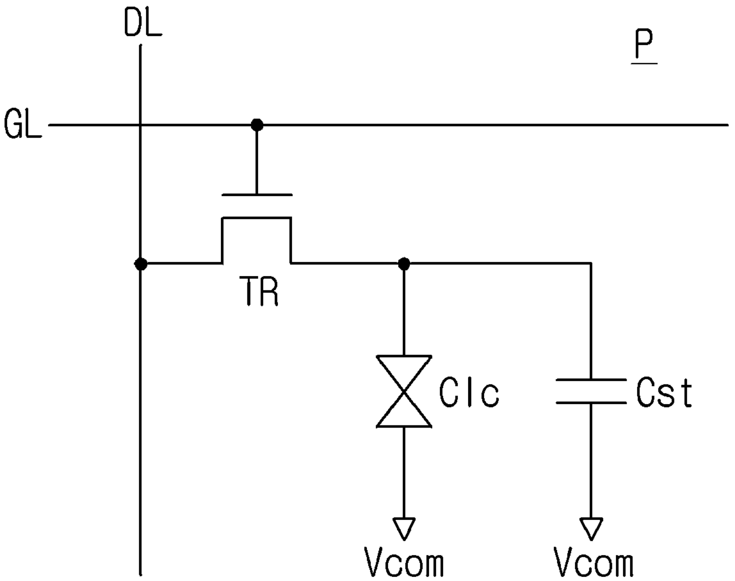
FIG. 6 is a circuit diagram of a pixel shown in FIG. 5 according to one embodiment.

FIG. 6 is a circuit diagram of a pixel shown in FIG. 5 according to one embodiment.

In one embodiment, the display device 200 (see FIG. 4) may be a liquid crystal display device, and the pixel P may be configured to charge a liquid crystal cell Clc to a data voltage corresponding to the image data DATA (see FIG. 1). In the present embodiment, the pixel P may include the switching transistor TR, the storage capacitor Cst, and the liquid crystal cell Clc.

The switching transistor TR includes a gate electrode connected to the gate line GL, a drain electrode connected to the data line DL, and a source electrode connected to a pixel electrode of the liquid crystal cell Clc. The switching transistor TR may be an n-channel field effect transistor. However, the type of the switching transistor TR is not limited, and the switching transistor TR may be a p-channel field effect transistor.

The liquid crystal cell Clc includes the pixel electrode connected to the source electrode of the switching transistor TR and the common electrode to which a common voltage Vcom is applied.

The storage capacitor Cst includes a first electrode connected to the source electrode of the switching transistor TR and a second electrode to which the common voltage Vcom is applied.

When a gate signal at a gate-on level is applied to the gate line GL, a data voltage corresponding to the corresponding pixel P may be applied to the data line DL. The data voltage is transmitted to the pixel electrode of the liquid crystal cell Clc and the first electrode of the storage capacitor Cst through the switching transistor TR in a turn-on state. In this case, the liquid crystal cell Clc and the storage capacitor Cst may be charged with a charge corresponding to a difference between the data voltage and the common voltage Vcom. The arrangement of liquid crystal molecules in the liquid crystal cell Clc is changed by an electric field between the pixel electrode and the common electrode, thereby changing and emitting light incident from the outside.

Figure 7:
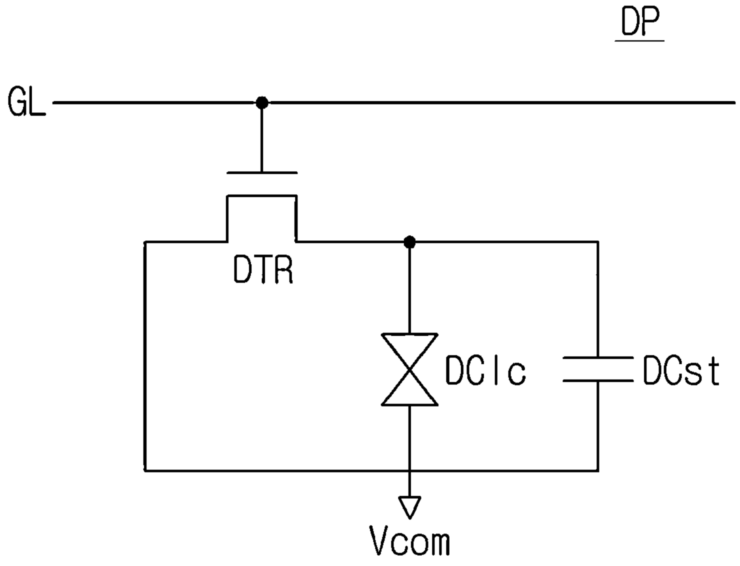
FIG. 7 is a circuit diagram of a dummy pixel shown in FIG. 5 according to one embodiment.

FIG. 7 is a circuit diagram of a dummy pixel shown in FIG. 5 according to one embodiment.

Referring to FIG. 7, the dummy pixel DP according to one embodiment may include the dummy switching transistor DTR, a dummy storage capacitor DCst, and a dummy liquid crystal cell DClc.

The dummy switching transistor DTR includes the gate electrode connected to the inverted signal line RL, the drain electrode receiving the common voltage Vcom, and the source electrode connected to the pixel electrode of the dummy liquid crystal cell DClc. The dummy switching transistor DTR may be an n-channel field effect transistor. However, the type of the dummy switching transistor DTR is not limited, and the dummy switching transistor DTR may be a p-channel field effect transistor.

The dummy liquid crystal cell DClc includes the pixel electrode connected to the source electrode of the dummy switching transistor DTR and the common electrode to which the common voltage Vcom is applied.

The dummy storage capacitor DCst includes a first electrode connected to the source electrode of the dummy switching transistor DTR and a second electrode to which the common voltage Vcom is applied.

Since such a dummy pixel DP is configured not to receive the data voltage and has a structure in which the source and drain electrodes of the dummy switching transistor DTR are electrically shorted, the dummy pixel DP is configured to output images while the pixel P is driven or emit black light.

Figure 8A:
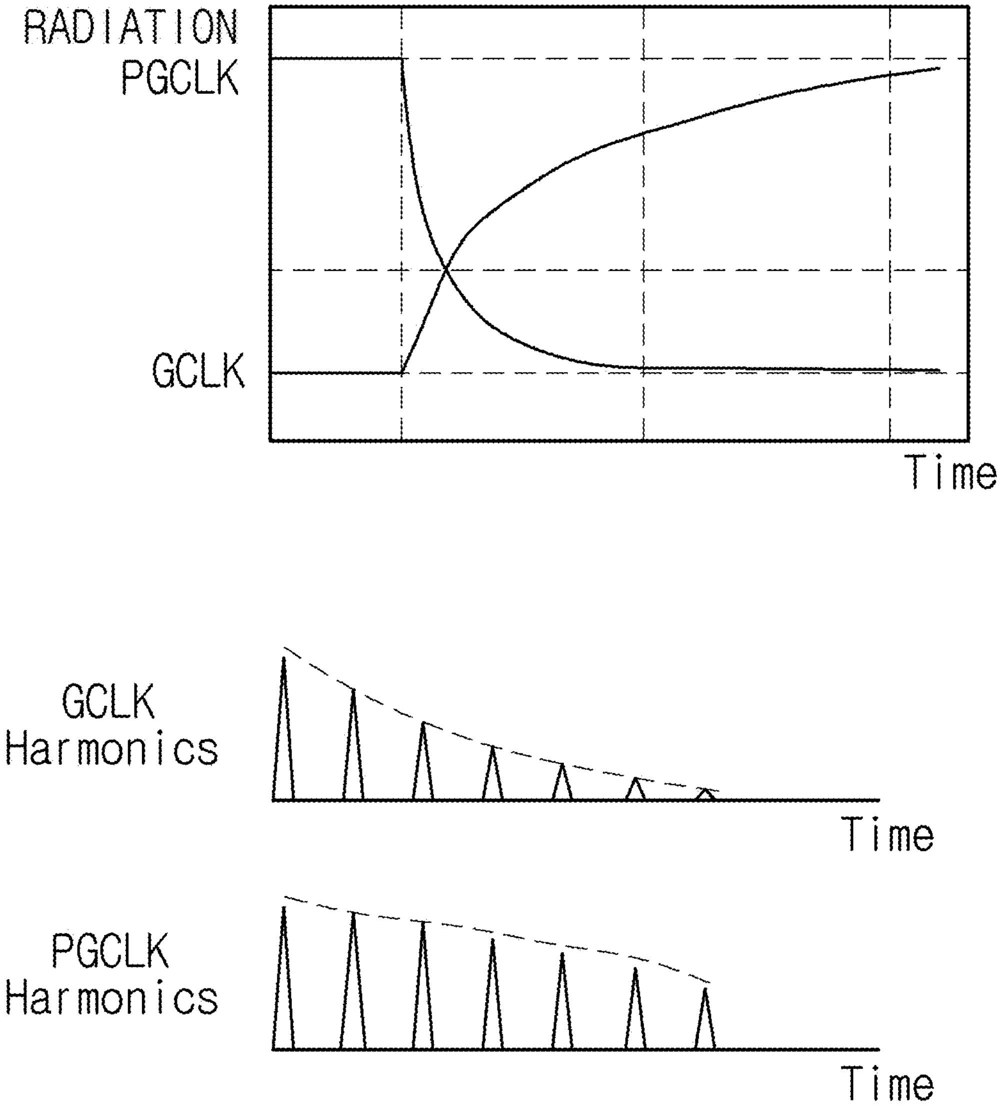
FIGS. 8A and 8B are views showing the field cancel improvement effect of the display device according to the second embodiment.
Figure 8B:
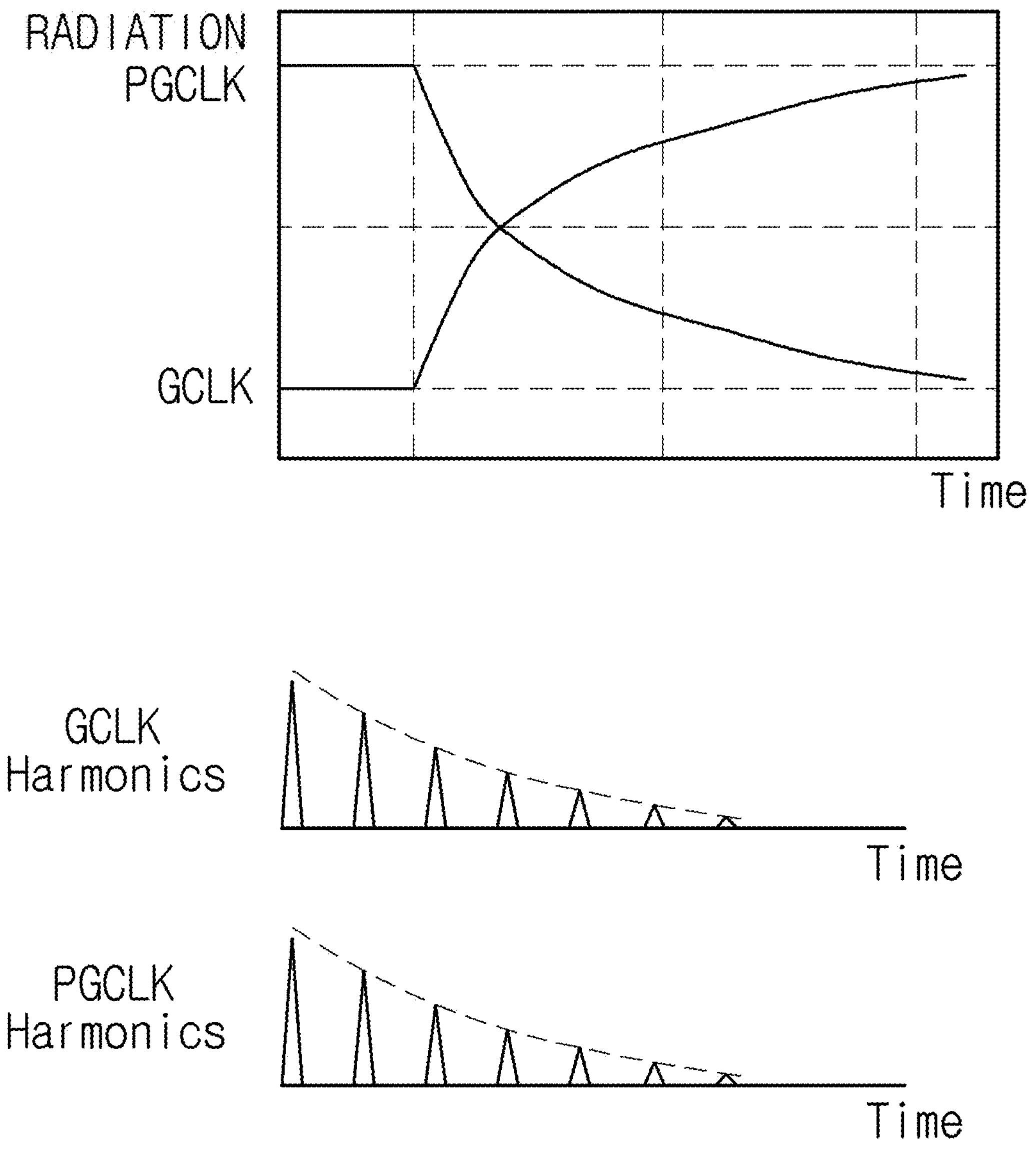

FIGS. 8A and 8B are views showing the field cancel improvement effect of the display device according to the second embodiment.

As in the embodiment shown in FIG. 2, when the inverted signal line RL is in an unloaded state, loads of the gate control line GCL and the gate line GL to which the original signal is applied and a load of the inverted signal line RL are different. In addition, due to the different loads, the gate clock signal GCLK that is the original signal and the inverted signal PGCLK have different slew rates as shown in FIG. 8A. As a result, the field cancel efficiency between the gate clock signal GCLK and the inverted signal PGCLK is degraded.

In the embodiment of FIGS. 4 to 7, the dummy pixel DP is connected to the inverted signal line RL, thereby minimizing the load deviation with the gate control line GCL and the gate line GL to which the original signal is applied. Therefore, as shown in FIG. 8B, the gate clock signal GCLK to which the original signal is applied and the inverted signal PGCLK may have substantially the same slew rate, and as a result, it is possible to increase the field cancel efficiency between the gate clock signal GCLK and the inverted signal PGCLK.

Figure 9:
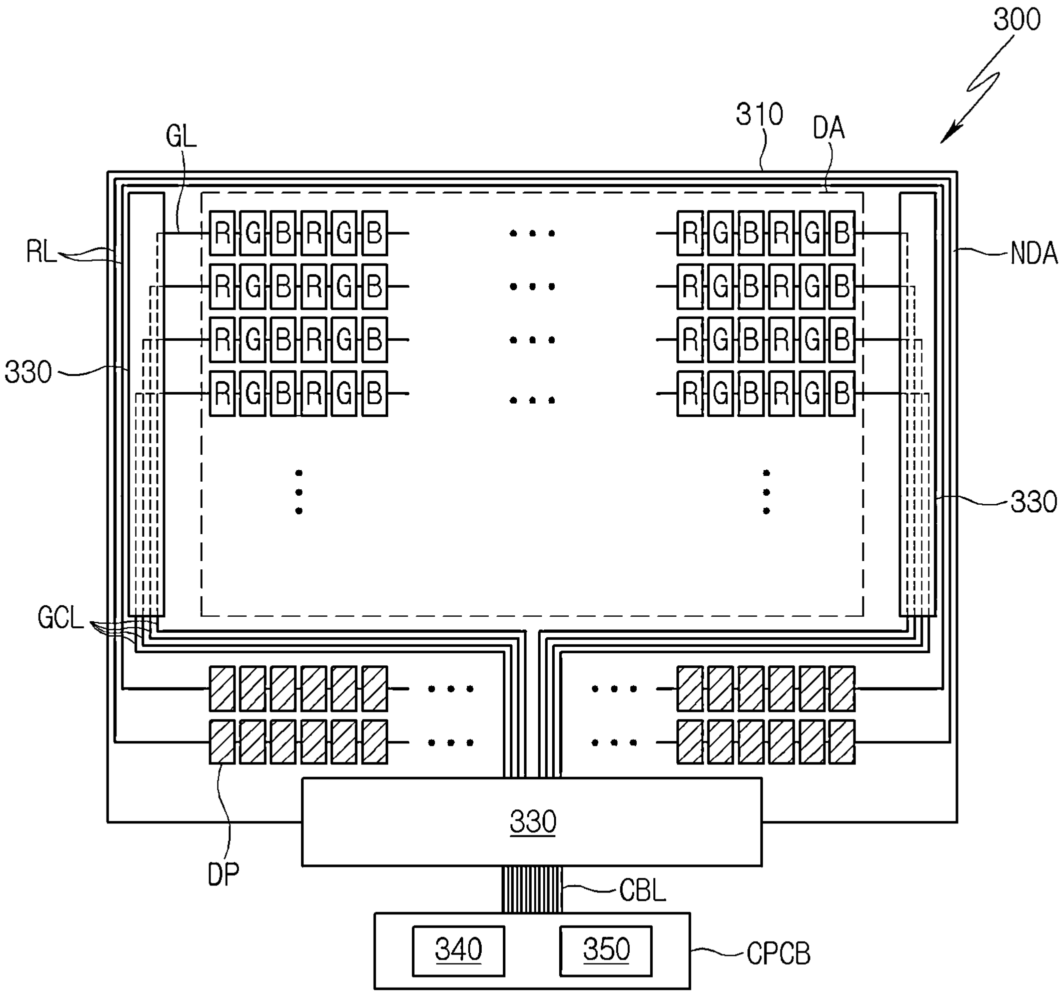
FIG. 9 is a schematic plan view of a display device according to a third embodiment.

FIG. 9 is a plan view of a display device according to a third embodiment.

Referring to FIG. 9, a display panel 310 may include a display area DA in which images are displayed and a non-display area NDA in which the images are not displayed near the display area DA.

The display area DA includes the data lines DL (see FIG. 1), the gate lines GL that intersect the data lines DL, and the array of pixels P (see FIG. 1) defined in intersection areas of the data lines DL and the gate lines GL.

At least some of the drivers may be mounted on or connected to the non-display area NDA. For example, a data driver 320 may be connected to one side of the non-display area NDA, and a gate driver 330 may be mounted at one side of the non-display area NDA.

In one embodiment, one or more inverted signal lines RL may be disposed in the non-display area NDA. The inverted signal line RL is configured to receive an inverted signal of a predetermined original signal. For example, the inverted signal line RL may receive the inverted signal having an anti-phase of the gate clock signal GCLK.

The inverted signal line RL may be disposed adjacent to a control signal line to which the original signal is applied and may have substantially the same shape as the control signal line. For example, the inverted signal line RL may be disposed adjacent to the gate control line GCL to which the gate clock signal GCLK is applied, and the gate line GL to which the gate clock signal GCLK is provided as a gate signal. As shown, in an embodiment in which the gate driver 330 is disposed at both sides of the display panel 310, the gate control line GCL and the gate line GL may form a closed loop. In the present embodiment, the inverted signal line RL may be disposed along an edge of the display panel 310 in the non-display area NDA and disposed in a closed loop shape surrounding the display area DA.

The inverted signal line RL may be formed to have the same material and/or the same electrical characteristics as the control signal line to which the original signal is applied. In FIG. 9, an example in which two inverted signal lines RL are disposed in the non-display area NDA is shown, but the present embodiment is not limited thereto.

The non-display area NDA further includes an array of dummy pixels DP connected to the inverted signal line RL. The dummy pixels DP may have the same arrangement as the pixels P disposed in the display area DA. For example, the dummy pixels DP may be aligned in a generally straight line with adjacent pixels P in row and column directions. The number of pixels P disposed in one pixel row may be equal to the number of dummy pixels DP disposed in one dummy pixel row. However, the present embodiment is not limited thereto.

In one embodiment, the dummy pixels DP are disposed at one side facing a level shifter 340 and a timing controller 350. Therefore, the dummy pixels DP are disposed adjacent to the level shifter 340 and the timing controller 350.

At least some of the drivers may be mounted on or connected to the non-display area NDA. For example, the data driver 320 may be connected to one side of the non-display area NDA, and the gate driver 330 may be mounted at one side of the non-display area NDA.

A display device 300 may include a control printed circuit board CPCB for mounting control components and various electrical devices.

The level shifter 340 and the timing controller 350 may be mounted on the control printed circuit board CPCB.

The level shifter 340 may be connected to the gate driver 330 through the gate control line GCL. The level shifter 340 may output the gate clock signal GCLK, the gate start signal GST, etc. to the gate driver 330 through the gate control line GCL.

In one embodiment, the level shifter 340 may be further connected to the inverted signal line RL. The level shifter 340 may output a predetermined inverted signal through the inverted signal line RL. For example, the level shifter 340 may apply an inverted signal having a phase opposite to that of the gate clock signal GCLK applied to the gate control line GCL.

Figure 10:
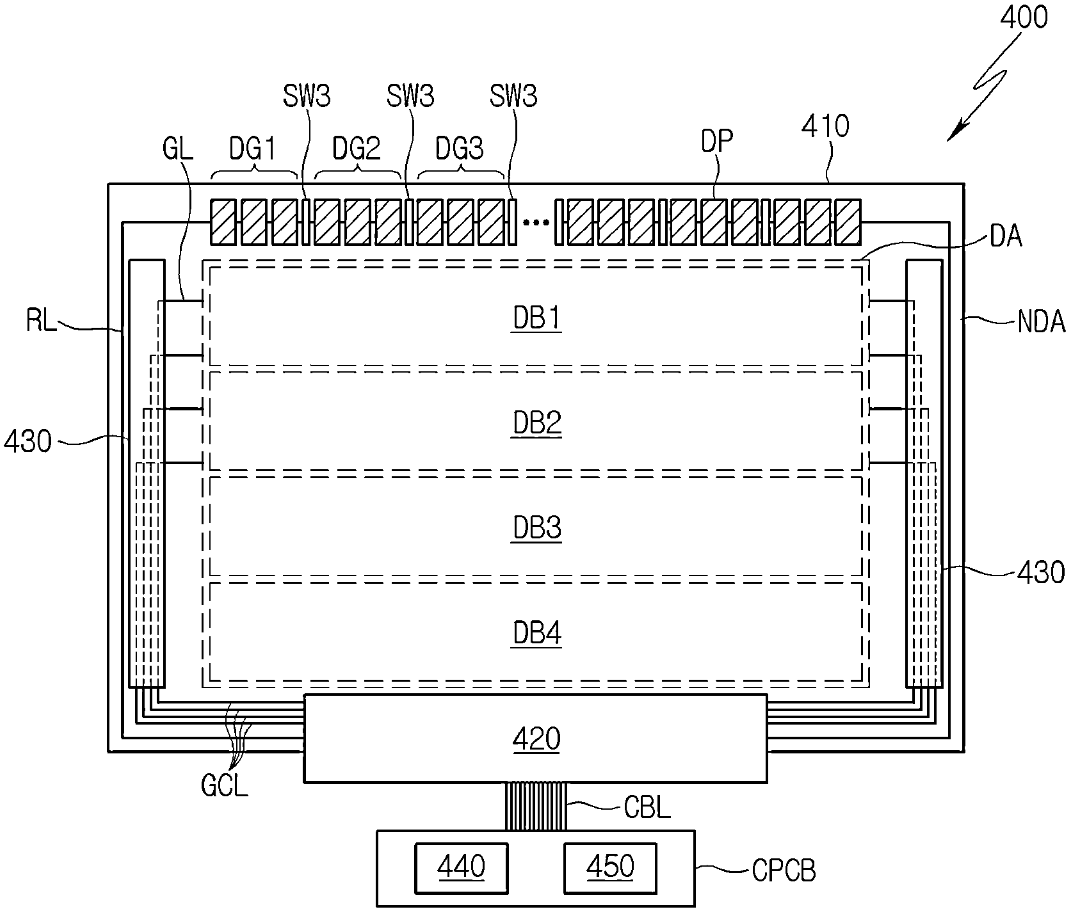
FIG. 10 is a schematic plan view of a display device according to a fourth embodiment.

FIG. 10 is a schematic plan view of a display device according to a fourth embodiment.

Referring to FIG. 10, a display panel 410 may include a display area DA in which images are displayed and a non-display area NDA in which the images are not displayed near the display area DA.

The display area DA includes the data lines DL (see FIG. 1), the gate lines GL that intersect the data lines DL, and the array of pixels P (see FIG. 1) defined in intersection areas of the data lines DL and the gate lines GL.

The display area DA may be divided into a plurality of display blocks DB1 to DB4. The display blocks DB1 to DB4 may be divided according to distances to the level shifter 440. Each of the display blocks DB1 to DB4 may include one or more pixel rows.

In the shown embodiment, the display area DA is divided into the four display blocks DB1 to DB4. When a column resolution of the display panel 410 is 1080 px, each of the display blocks DB1 to DB4 may include 270 pixel rows.

However, the present embodiment is not limited thereto, and the sizes of the display blocks DB1 to DB4 and/or the number of pixel rows included in the display blocks DB1 and DB2 may be selected in any of various ways according to the size and resolution of the display panel 410.

At least some of the drivers may be mounted on or connected to the non-display area NDA. For example, the data driver 420 may be connected to one side of the non-display area NDA, and the gate driver 430 may be mounted at one side of the non-display area NDA.

The gate driver 430 may be composed of stage circuits connected one-to-one to the plurality of gate lines GL. The stage circuits are configured to provide the gate signal to the pixel rows of the display block DB1 to DB4 corresponding one-to-one thereto. A structure of the gate driver 430 will be described in more detail below with reference to FIG. 11. The gate driver 430 may be configured in a gate in panel type mounted on the non-display area NDA of the display panel 410.

In one embodiment, one or more inverted signal lines RL may be disposed in the non-display area NDA. The inverted signal line RL is configured to receive an inverted signal of a predetermined original signal. For example, the inverted signal line RL may receive the inverted signal having an anti-phase of the gate clock signal GCLK.

The inverted signal line RL may be disposed adjacent to a control signal line to which the original signal is applied and may have substantially the same shape as the control signal line. For example, the inverted signal line RL may be adjacent to the gate control line GCL to which the gate clock signal GCLK is applied, and the gate line GL to which the gate clock signal GCLK is provided as a gate signal. As shown, in an embodiment in which the gate driver 430 is disposed at both sides of the display panel 410, the gate control line GCL and the gate line GL may form a closed loop. In the present embodiment, the inverted signal line RL may be disposed along an edge of the display panel 410 in the non-display area NDA and disposed in a closed loop shape surrounding the display area DA.

The inverted signal line RL may be formed to have the same material and/or the same electrical characteristics as the control signal line to which the original signal is applied. In FIG. 10, an example in which one inverted signal line RL is disposed in the non-display area NDA is shown, but the present embodiment is not limited thereto.

The non-display area NDA further includes an array of dummy pixels DP connected to the inverted signal line RL. The dummy pixels DP may have the same arrangement as the pixels P disposed in the display area DA. For example, the dummy pixels DP may be aligned in a generally straight line with adjacent pixels P in row and column directions. The number of pixels P disposed in one pixel row may be equal to the number of dummy pixels DP disposed in one dummy pixel row. However, the present embodiment is not limited thereto.

In one embodiment, the non-display area NDA further includes one or more switching elements SW1 to SW3 connected to the inverted signal line RL to open or close the inverted signal line RL. The switching elements SW1 to SW3 may be, for example, thin film transistors. In this case, the switching elements SW1 to SW3 may be turned on or turned off in response to a carry signal and/or a gate start signal GST output from a level shifter 440 and/or the gate driver 430.

As shown, when the level shifter 440 and/or the gate driver 430 are provided at both sides of the non-display area NDA, the switching elements SW1 to SW3 may be provided symmetrically at both sides of the non-display area NDA, and the symmetrical switching elements SW1 to SW3 may be controlled together in the same manner.

The one or more switching elements SW1 to SW3 are disposed between the dummy pixels DP at a predetermined interval. For example, the one or more switching elements SW1 to SW3 may be disposed between dummy pixel groups DG1 to DG3 composed of one or more dummy pixels DP. The dummy pixel groups DG1 to DG3 may be grouped to include the same or different number of dummy pixels DP.

The switching elements SW1 to SW3 are turned off or turned on between the gate electrodes of two dummy pixels DP adjacent to each other to open or close the inverted signal line RL. According to the ON/OFF of the switching elements SW1 to SW3, the number of dummy pixel groups DG1 to DG3 (the number of dummy pixels DP) receiving the inverted signal PGCLK through the inverted signal line RL may be controlled. For example, in the shown embodiment, when the first to third switching elements SW1 to SW3 are all turned on, the inverted signal PGCLK may be applied to the dummy pixels DP of the first to third dummy pixel groups DG1 to DG3. When the third switching element SW3 is turned off and only the first and second switching elements SW1 and SW2 are turned on, the inverted signal PGCLK may be applied to the dummy pixel DP of the first and second dummy pixel groups DG1 and DG2. When the second and third switching element SW2 and SW3 are turned off and only the first switching element SW1 is turned on, the inverted signal PGCLK may be applied to only the dummy pixels DP of the first dummy pixel group DG1.

As the number of dummy pixels DP to which the inverted signal PGCLK is applied is controlled as described above, the load and substantial length of the inverted signal line RL may be adjusted. Through such a control method, the electromagnetic field radiation generated from the inverted signal line RL can be controlled more efficiently, and the slew rate deviation between the original signal and the inverted signal can be reduced more effectively.

The ON/OFF of the switching elements SW1 to SW3 may be determined corresponding to the activated display blocks DB1 to DB4. In other words, the ON/OFF of the switching elements SW1 to SW3 may be determined according to locations of the display blocks DB1 to DB4 to which the gate clock signal GCLK (gate signal), which is the original signal, is applied.

The display blocks DB1 to DB4 have different distances from the level shifter 440 according to their arrangement. Therefore, the loads and slew rates of the signal lines connecting the display blocks DB1 to DB4 to the level shifter 440 may be different for each display block DB1 to DB4. Therefore, by turning on/off the switching elements SW1 to SW3, the load and slew rate of the inverted signal line RL are adaptively adjusted according to the load and slew rate of the signal line to which the original signal is applied, thereby improving the field cancel effect.

For example, when the original signal is applied to the first display block DB1 having the greatest load of the signal line, the first to third switching elements SW1 to SW3 are all turned on, thereby maximizing the load of the inverted signal line RL. Conversely, when the original signal is applied to the fourth display block DB4 having the smallest load of the signal line, the first to third switching elements SW1 to SW3 are all turned off, thereby minimizing or at least reducing the load of the inverted signal line RL.

At least some of the drivers may be mounted on or connected to the non-display area NDA. For example, a data driver 420 may be connected to one side of the non-display area NDA, and a gate driver 430 may be mounted at one side of the non-display area NDA.

A display device 400 may include a control printed circuit board CPCB for mounting control components and various electrical devices.

The level shifter 440 and the timing controller 450 may be mounted on the control printed circuit board CPCB.

The level shifter 440 may be connected to the gate driver 430 through the gate control line GCL. The level shifter 440 may output the gate clock signal GCLK, the gate start signal GST, etc. to the gate driver 430 through the gate control line GCL.

In one embodiment, the level shifter 440 may be further connected to the inverted signal line RL. The level shifter 440 may output a predetermined inverted signal through the inverted signal line RL. For example, the level shifter 440 may apply an inverted signal having a phase opposite to that of the gate clock signal GCLK applied to the gate control line GCL.

Figure 11:
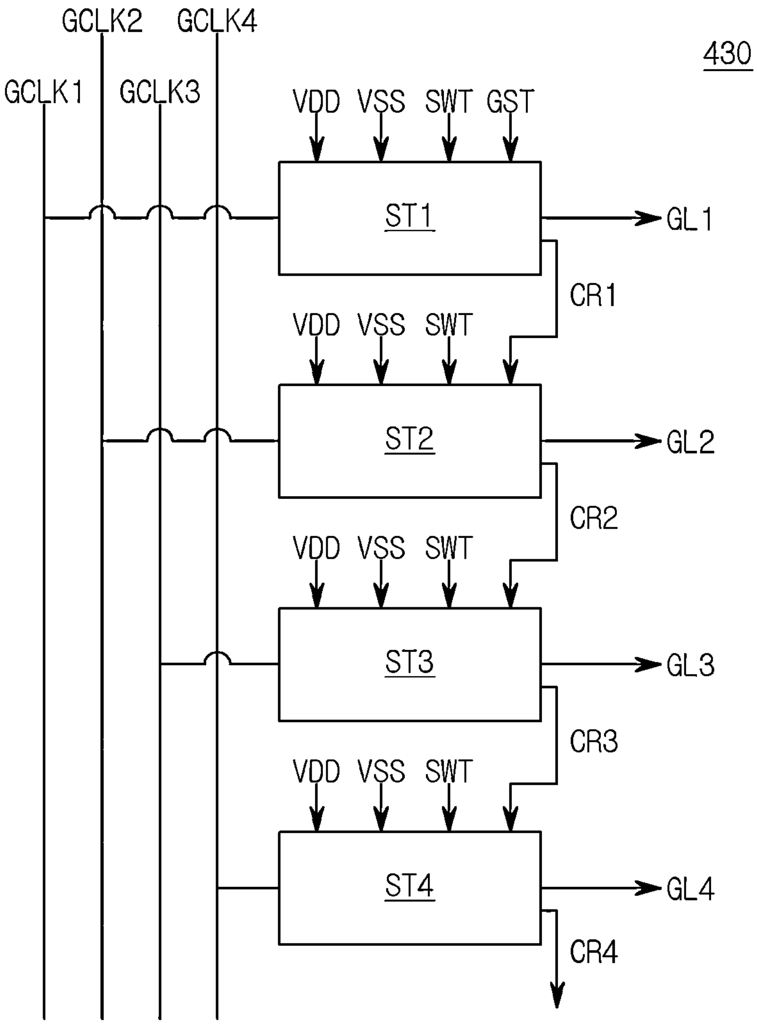
FIG. 11 is a block diagram schematically showing a structure of a gate driver of FIG. 10 according to one embodiment.

FIG. 11 is a block diagram schematically showing a structure of a gate driver of FIG. 10 according to one embodiment.

Referring to FIG. 11, the gate driver 430 may include a plurality of stage circuits ST1 to ST4. For convenience of description, FIG. 11 shows the four stage circuits ST1 to ST4 included in the gate driver 430, but other number of stage circuits may be included in the gate driver 430.

The second stage circuit ST2 may be dependently connected to the first stage circuit ST1, the third stage circuit ST3 may be dependently connected to the second stage circuit ST2, and the fourth stage circuit ST4 may be dependently connected to the third stage circuit ST3. The first to fourth stage circuits ST1 to ST4 may have substantially the same configuration.

The stage circuits ST1 to ST4 may be connected one-to-one to the corresponding gate lines GL1 to GL4 and may output gate signals in response to the gate clock signals GCLK1 to GCLK4.

The gate start signal GST may be received the first stage circuit ST1. In addition, the second to fourth stage circuits ST2 to ST4 may each receive a carry signal (i.e., one of first to third carry signals CR1 to CR3) output from the previous stage circuits ST1 to ST3. For example, the second stage circuit ST2 may receive the first carry signal CR1 output from the first stage circuit ST1, the third stage circuit ST3 may receive the second carry signal CR2 output from the second stage circuit ST2, and the fourth stage circuit ST4 may receive the third carry signal CR3 output from the third stage circuit ST3.

In addition, the stage circuits ST1 to ST4 may alternately receive one or more gate clock signals GCLK1 to GCLK4. For example, an $i^{th}$ stage circuit may receive the first gate clock signal GCKL1 (i is an integer greater than zero), an $(i+1)^{th}$ stage circuit may receive the second gate clock signal GCLK2, an $(i+2)^{th}$ stage circuit may receive the third gate clock signal GCLK3, and an $(i+3)^{th}$ stage circuit may receive the fourth gate clock signal GCLK4.

In the present embodiment, as shown, the first stage circuit ST1 may receive the first gate clock signal GCKL1, the second stage circuit ST2 may receive the second gate clock signal GCLK2, The third stage circuit ST3 may receive the third gate clock signal GCLK3, and the fourth stage circuit ST4 may receive the fourth gate clock signal GCLK4.

The gate clock signals GCLK1 to GCLK4 may have the same waveform and may be phase-shifted signals. For example, the second gate clock signal GCLK2 may be a signal having the same waveform as the first clock signal GCLK1 and a phase shifted (phase delayed) at a predetermined interval (about 1H), the third gate clock signal GCLK3 may be a signal having the same waveform as the second clock signal GCLK2 and a phase shifted (phase delayed) at a predetermined interval (about 1H), and the fourth gate clock signal GCLK4 may be a signal having the same waveform as the third clock signal GCLK3 and a phase shifted (phase delayed) at a predetermined interval (about 1H).

Additionally, power voltages VDD and VSS necessary for driving the stage circuits ST1 to ST4 may be applied to the stage circuits ST1 to ST4. For example, the high potential driving voltage VDD and the low potential driving voltage VSS may be applied to the stage circuits ST1 to ST4. The high potential driving voltage VDD and the low potential driving voltage VSS may have DC voltage levels. Here, a voltage level of the high potential driving voltage VDD may be set higher than a voltage level of the low potential driving voltage VSS.

In addition, a reset signal SWT may be applied to the stage circuits ST1 to ST4. A gate-on voltage may be applied to all gate lines GL1 to GL4 according to the reset signal SWT to initialize the pixels P.

The stage circuits ST1 to ST4 may output the gate signals. The gate signals output from the stage circuits ST1 to ST4 may be provided to the corresponding gate lines GL1 to GL4, respectively.

The stage circuits ST1 to ST4 may further output the carry signals CR1 to CR4. The carry signals CR1 to CR4 output from the stage circuits ST1 to ST4 may be provided to the next stage circuits ST2 to ST4, respectively. For example, the first carry signal CR1 output from the first stage circuit ST1 may be provided to the second stage circuit ST2, the second carry signal CR2 output from the second stage circuit ST2 may be provided to the third stage circuit ST3, the third carry signal CR3 output from the third stage circuit ST3 may be provided to the fourth stage circuit ST4, and the fourth carry signal CR4 output from the fourth stage circuit ST4 may be provided to a fifth stage circuit (not shown).

The stage circuits ST1 to ST4 included in the gate driver 430 may have substantially the same configuration excluding the type of receiving signal. For example, the first stage circuit ST1, which is the first stage circuit for receiving a start signal GST, and the remaining stage circuits (e.g., the second to fourth stage circuits ST2 to ST4) for receiving the carry signals CR1 to CR4 of the previous stage circuit may have substantially the same circuit configuration excluding the receiving input signal (i.e., the start signal GST or the carry signal CR1 to CR4 of the previous stage circuit) and may be operated in substantially the same manner.

Figure 12:
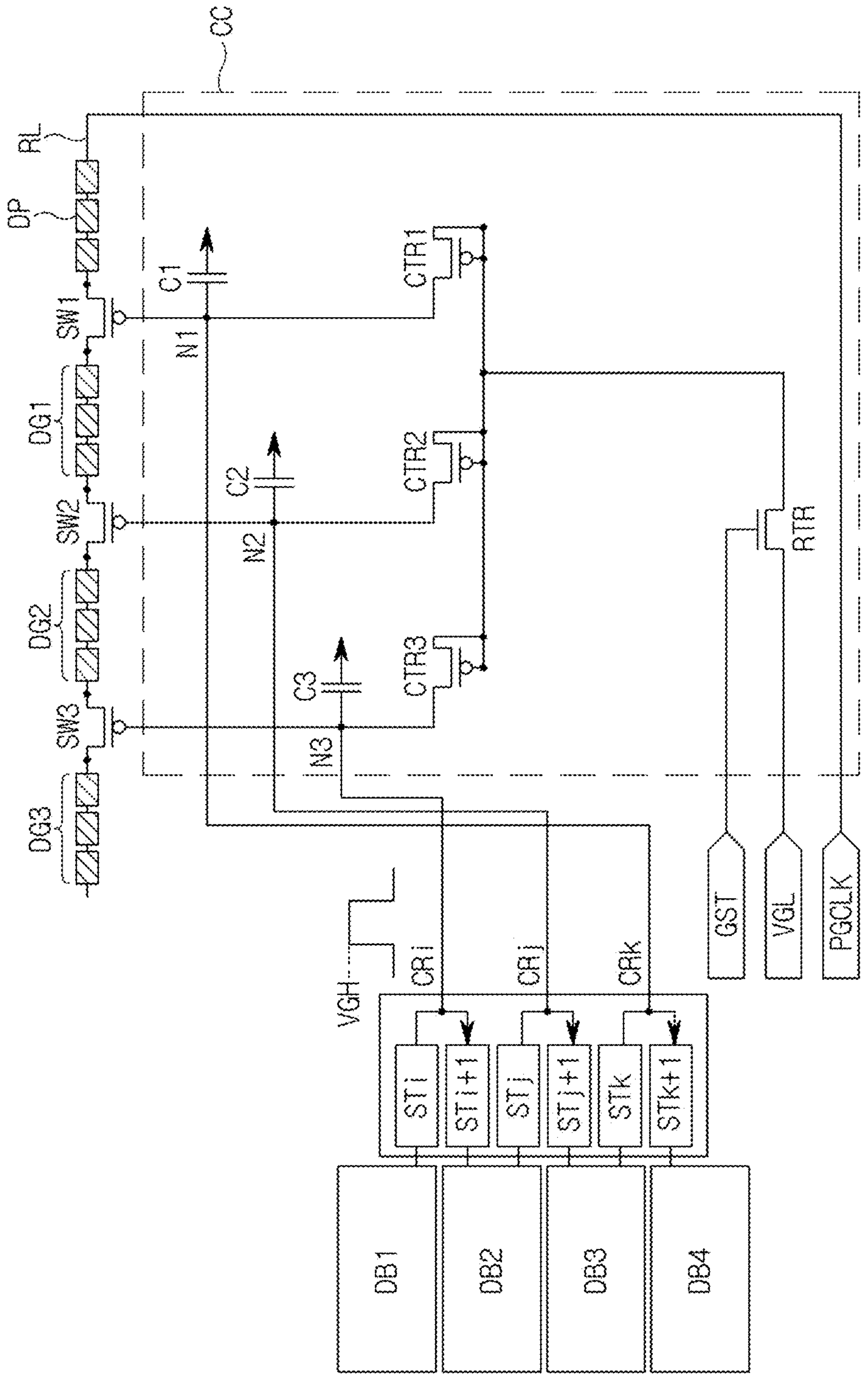
FIG. 12 is an enlarged view of a portion of the display device shown in FIG. 10 according to one embodiment.

FIG. 12 is an enlarged view of a portion of the display device shown in FIG. 10 according to one embodiment. Specifically, FIG. 12 shows connection portions between the gate driver 430 and the switching elements SW1 to SW3.

Referring to FIG. 12, the gate driver 430 and the switching elements SW1 to SW3 may be connected through a control circuit CC. The control circuit CC may include first to third nodes N1 to N3, storage capacitors C1 to C3, a reset transistor RTR, and control transistors CTR1 to CTR3.

The first to third nodes N1 to N3 are respectively connected to the corresponding stage circuits STi, STj, and STk of the gate driver 430 (i, j, and k are integers greater than zero, and an i<j<k condition is satisfied). The first to third nodes N1 to N3 are configured to receive carry signals CRi, CRj, and CRk output from the stage circuits STi, STj, and STk. Here, the stage circuits STi, STj, and STk may be the stage circuits STi, STj, and STk connected to the last pixel row of each of the display blocks DB1 to DB4. When the stage circuits STi, STj, and STk sequentially output the carry signals CRi, CRj, and CRk at the gate high voltage VGH, the gate high voltage VGH is transmitted to the first to third nodes N1 to N3.

One electrodes of the storage capacitors C1 to C3 are connected one-to-one to the first to third nodes N1 to N3. The other electrodes of the storage capacitors C1 to C3 may be connected to the ground voltage. The storage capacitors C1 to C3 may store voltages corresponding to the carry signals CR1 to CR3 or gate-on voltages applied to the first to third nodes N1 to N3, thereby stabilizing the voltages at the first to third nodes N1 to N3.

The reset transistor RTR is connected between the gate-on voltage and the gate electrodes of the control transistors CTR1 to CTR3. In the shown embodiment, the control transistors CTR1 to CTR3 and the switching elements SW1 to SW3 are p-channel field effect transistors. In the present embodiment, the gate-on voltage is the gate low voltage VGL.

However, the present embodiment is not limited thereto, and in another embodiment, the control transistors CTR1 to CTR3 and the switching elements SW1 to SW3 may be n-channel field effect transistors. In the present embodiment, the gate-on voltage is the gate high voltage VHL.

A gate electrode of the reset transistor RTR is configured to receive the gate start signal GST. When the gate start signal GST is applied to the first stage circuit ST1 (see FIG. 11) of the gate driver 430, the reset transistor RTR receives the gate start signal GST through the gate electrode. The reset transistor RTR is turned on by the gate start signal GST to transmit the gate-on voltage to the gate electrodes of the control transistors CTR1 to CTR3.

The control transistors CTR1 to CTR3 are respectively diode-connected between the reset transistor RTR and the first to third nodes N1 to N3. The gate electrodes of the control transistors CTR1 to CTR3 are connected to the reset transistor RTR. When the gate-on voltage is applied through the reset transistor RTR, the control transistors CTR1 to CTR3 are turned on in response to the gate-on voltage to transmit the gate-on voltage to the first to third nodes N1 to N3. The switching elements SW1 to SW3 may all be turned on in response to the gate-on voltage.

The switching elements SW1 to SW3 are disposed between the dummy pixels DP at a predetermined interval. For example, the switching elements SW1 to SW3 may be disposed between the dummy pixel groups DG1 to DG3 composed of one or more dummy pixels DP. The dummy pixel groups DG1 to DG3 may be grouped to include the same or different number of dummy pixels DP.

The source and drain electrodes of the switching elements SW1 to SW3 are connected to the inverted signal line RL. Gate electrodes of the switching elements SW1 to SW3 are connected one-to-one to the first to third nodes N1 to N3 of the control circuit CC. When the carry signals CR1 to CR3 of the gate high voltage VGH are sequentially output to the first to third nodes N1 to N3, the switching elements SW1 to SW3 may be sequentially turned off in response to the carry signals CR1 to CR3. The storage capacitors C1 to C3 store voltages corresponding to the carry signals CR1 to CR3 and maintain the voltages at the first to third nodes N1 to N3 as the gate high voltage VGH. While the voltages at the first to third nodes N1 to N3 are maintained, the switching elements SW1 to SW3 may maintain the turn-off state.

When the switching elements SW1 to SW3 are turned off, a space between the dummy pixel groups DG1 to DG3 may be opened. In other words, the dummy pixel groups DG1 to DG3 may be sequentially separated from the inverted signal line RL by sequentially turning off the switching elements SW1 to SW3.

Figure 13:
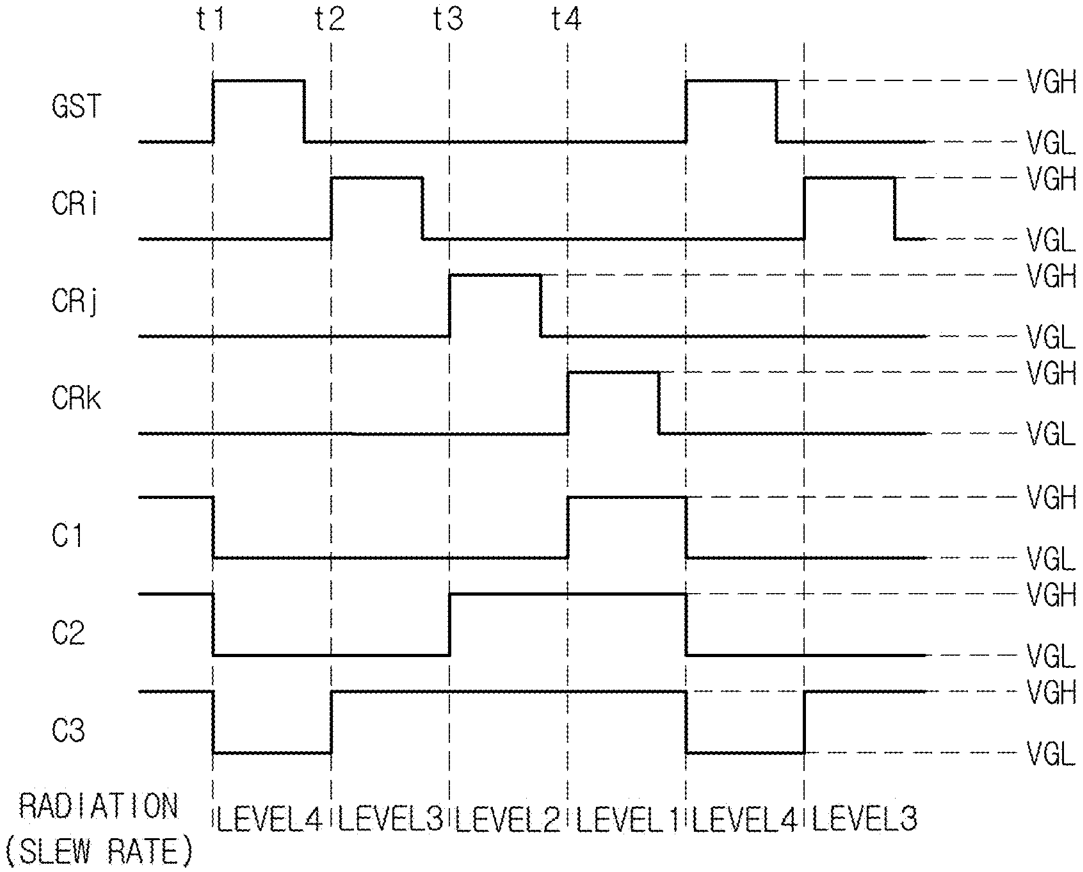
FIG. 13 is a waveform diagram of signals applied to a control circuit shown in FIG. 12.

FIG. 13 is a waveform diagram of signals applied to a control circuit shown in FIG. 12 according to one embodiment. FIGS. 14A to 14D are views for describing the field cancel improvement effect of the display device according to the fourth embodiment.

Referring to FIGS. 12 and 13 together, the driving of the gate driver 430 may be initiated, and the gate start signal GST may be applied to the first stage circuit ST1 (see FIG. 11) during a first period t1. Then, the reset transistor RTR may be turned on in response to the gate start signal GST, and the gate low voltage VGL may be applied to the control transistors CTR1 to CTR3 through the reset transistor RTR.

The control transistors CTR1 to CTR3 may transmit the gate low voltage VGL to the first to third nodes N1 to N3. The storage capacitors C1 to C3 connected to the first to third nodes N1 to N3 are charged to the gate low voltage VGL.

The switching elements SW1 to SW3 are turned on in response to the voltages at the first to third nodes N1 to N3. Then, the first to third dummy pixel groups DG1 to DG3 are closed, and all of the first to third dummy pixel groups DG1 to DG3 are electrically connected to the inverted signal line RL.

Figure 14A:
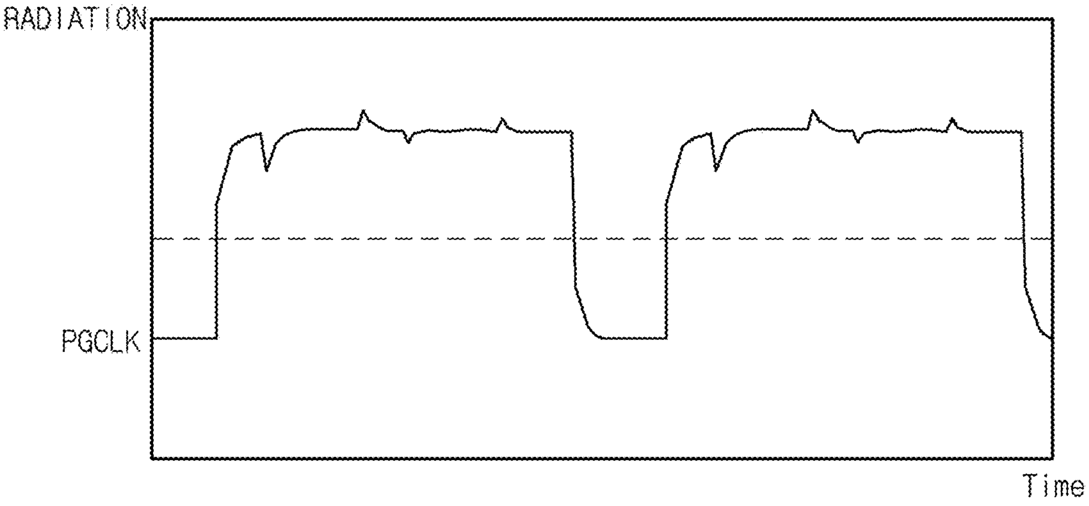
FIGS. 14A, 14B, 14C and 14D are views for describing the field cancel improvement effect of the display device according to the fourth embodiment.

In this case, as shown in FIG. 14A, the load of the inverted signal line RL may be maximum, and the slew rate of the electromagnetic radiation of the inverted signal PGCLK may be minimum (level 4).

After the gate start signal GST, the stage circuits constituting the gate driver 430 sequentially output the gate signal and the carry signal at the gate high voltage VGH. The stage circuits ST1 to STi connected to the first display block DB1 may be sequentially driven, and the $i^{th}$ carry signal CRi at the high voltage VGH may be output from the $i^{th}$ stage circuit STi lastly connected to the first display block DB1 during a second period t2.

The $i^{th}$ carry signal CRi is provided to the third node N3. The third storage capacitor C3 connected to the third node N3 is charged to the gate high voltage VGH corresponding to the $i^{th}$ carry signal CRi.

The third switching element SW3 is turned off in response to the voltage at the third node N3. Then, a space between the third dummy pixel group DG3 and the second dummy pixel group DG2 is opened, and the third dummy pixel group DG3 is electrically separated from the inverted signal line RL.

Figure 14B:
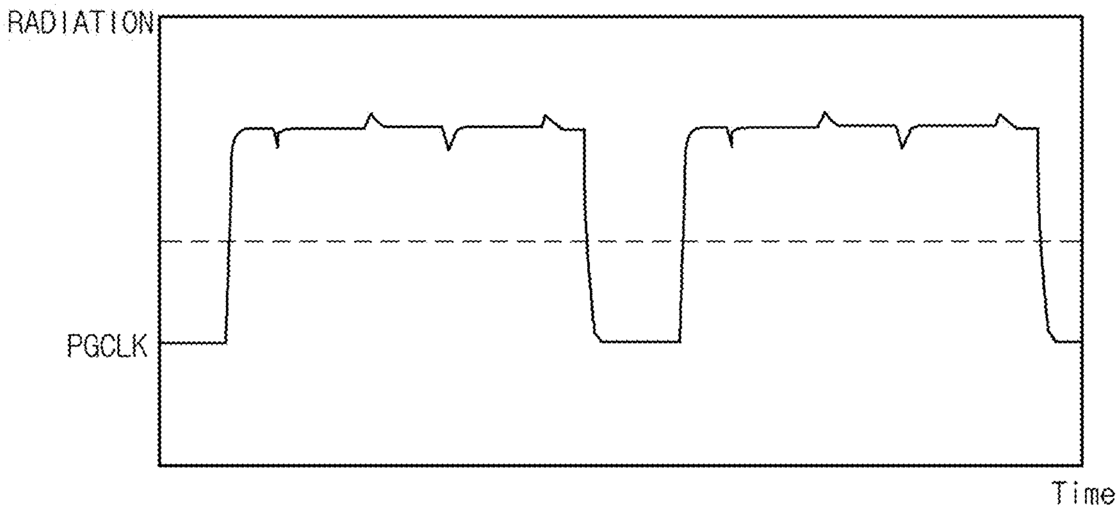

In this case, the load of the inverted signal line RL may be reduced compared to the first period t1, and as shown in FIG. 14B, the slew rate of the electromagnetic radiation of the inverted signal PGCLK may increase (level 3) corresponding to the load reduction level.

During a third period t3, a $j^{th}$ carry signal CRj at the high voltage VGH may be output from a $j^{th}$ stage circuit STj lastly connected to the second display block DB2.

The $j^{th}$ carry signal CRj is provided to the second node N2. The second storage capacitor C2 connected to the second node N2 is charged to the gate high voltage VGH corresponding to the $j^{th}$ carry signal CRj.

The second switching element SW2 is turned off in response to the voltage at the second node N2. Then, a space between the second dummy pixel group DG2 and the first dummy pixel group DG1 is opened, and the second dummy pixel group DG2 is electrically separated from the inverted signal line RL.

Figure 14C:
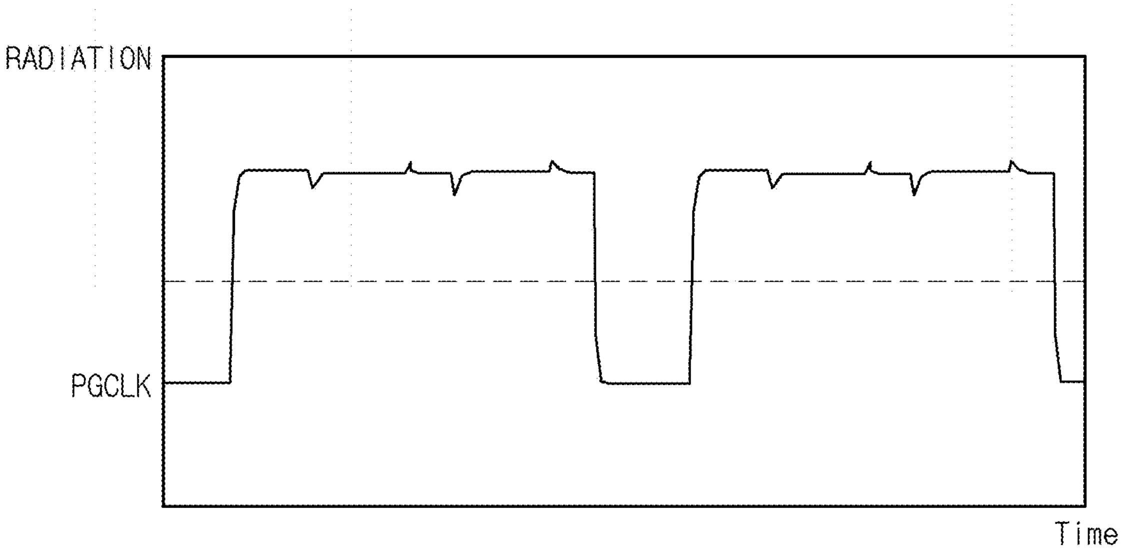

In this case, the load of the inverted signal line RL may be reduced compared to the second period t2, and as shown in FIG. 14C, the slew rate of the electromagnetic radiation of the inverted signal PGCLK may increase (level 2) corresponding to the load reduction level.

During a fourth period t4, a $k^{th}$ carry signal CRk at the high voltage VGH may be output from a $k^{th}$ stage circuit STk lastly connected to the third display block DB3.

The $k^{th}$ carry signal CRk is provided to the first node N1. The first storage capacitor C1 connected to the first node N1 is charged to the gate high voltage VGH corresponding to the $k^{th}$ carry signal CRk.

The first switching element SW1 is turned off in response to the voltage at the first node N1. Then, a space between the first dummy pixel group DG1 and the inverted signal line RL is opened, and the first dummy pixel group DG1 is electrically separated from the inverted signal line RL.

Figure 14D:
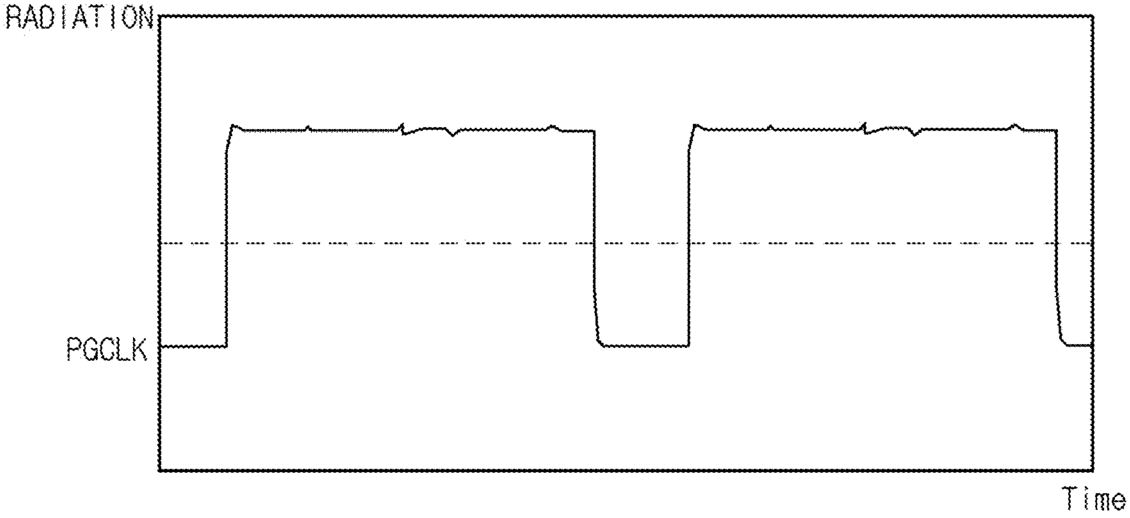

In this case, the load of the inverted signal line RL may be minimum, and as shown in FIG. 14D, the slew rate of the electromagnetic radiation of the inverted signal PGCLK may be maximum (level 1).

In FIGS. 14A to 14D, the load of the inverted signal line PGCLK according to the number of dummy pixels DP connected to the inverted signal line RL and the slew rate of the electromagnetic radiation of the inverted signal PGCLK accordingly may be as shown in Table 1.

TABLE 1

| Level | Number of dummy pixels | Load (%) | Rising time (ns) | Falling time (ns) |
|---|---|---|---|---|
| 4 | All | 100% | 231 | 292 |
| 3 | ½ | 50% | 99.88 | 105.5 |
| 2 | ¼ | 25% | 75.15 | 80.55 |
| 1 | 0 | 0% | 57.88 | 59.99 |

As the number of dummy pixels DP to which the inverted signal PGCLK is applied is controlled as described above, the load and substantial length of the inverted signal line RL may be adjusted. Through such a control method, the electromagnetic field radiation generated from the inverted signal line RL can be controlled more efficiently, and the slew rate deviation between the original signal and the inverted signal can be reduced more effectively.

According to the display device according to the embodiments, it is possible to remove the radiation deviation between the inverted signal and the original signal by forming the inverted signal line to which the inverted signal is applied in the same closed loop shape as the signal line to which the original signal is applied.

According to the display device according to the embodiments, it is possible to remove the waveform deviation caused by the load difference between the signal line to which the original signal is applied and the inverted signal line by connecting the inverted signal line to which the inverted signal is applied to the dummy pixel.

According to the display device according to the embodiments, it is possible to increase the field cancel efficiency between the original signal and the inverted signal and improve the electromagnetic interference prevention effect.

Although the embodiments of the present invention have been described above with reference to the accompanying drawings, those skilled in the art to which the present invention pertains will be able to understand that the above-described technical configuration of the present invention can be carried out in other specific forms without changing the technical spirit or essential features thereof. Therefore, it should be understood that the above-described embodiments are illustrative and not restrictive in all respects. In addition, the scope of the present invention is described by the claims to be described below rather than the detailed description. In addition, the meaning and scope of the claims and all changed or modified forms derived from the equivalent concept should be construed as being included in the scope of the present invention.

What is claimed is:

1. A display device comprising:

a display panel including a display area in which pixels are disposed and a non-display area surrounding the display area;

a level shifter disposed at least on one side of the non-display area, the level shifter configured to generate a gate clock signal and an inverted signal having a phase opposite to that of the gate clock signal;

a control signal line configured to transmit the gate clock signal that is output from the level shifter to the pixels;

an inverted signal line configured to receive the inverted signal from the level shifter; and dummy pixels disposed in the non-display area and connected to the inverted signal line which receives the inverted signal from the level shifter, wherein the inverted signal line extends in a closed loop shape along an edge of the display panel in the non-display area to entirely surround the display area, and wherein each of the dummy pixels includes:

a dummy light emission control circuit including a dummy light emitting element and at least one circuit element configured to control light emission of the dummy light emitting element; and a dummy switching transistor having a gate electrode connected to the inverted signal line and a source electrode and a drain electrode electrically shorted.

2. The display device of claim 1, further comprising:

a gate driver configured to output gate signals to the pixels in response to the gate clock signal.

3. The display device of claim 2, wherein the gate driver receives the gate clock signal through a gate control line and outputs a gate signal from the gate signals through a gate line, and the control signal line includes the gate control line and the gate line.

4. The display device of claim 1, wherein the dummy pixels are at another side of the display panel that is opposite to the level shifter.

5. The display device of claim 1, wherein the dummy pixels are at one side of the display panel that faces the level shifter.

6. The display device of claim 1, wherein the dummy pixels include a same number and a same type of circuit elements as the pixels.

7. The display device of claim 1, wherein the dummy light emission control circuit includes:

the dummy light emitting element including a dummy liquid crystal cell connected between the dummy switching transistor and a common electrode; and a dummy storage capacitor connected between the dummy liquid crystal cell and the common electrode, and wherein the dummy switching transistor is connected between the dummy liquid crystal cell and the common electrode.

8. The display device of claim 1, further comprising:

one or more switching elements connected to the inverted signal line, the one or more switching elements configured to disconnect and connect the inverted signal line.

9. The display device of claim 8, wherein the one or more switching elements are between the dummy pixels at a predetermined interval.

10. The display device of claim 8, wherein the dummy pixels are grouped into a plurality of dummy pixel groups each including a same or different number of dummy pixels, and the one or more switching elements are each between the plurality of dummy pixel groups.

11. The display device of claim 10, further comprising a gate driver that includes a plurality of stage circuits configured to receive a gate start signal or a carry signal output from a previous stage and the gate clock signal and output a gate signal to one or more corresponding pixel rows.

12. The display device of claim 11, wherein the one or more switching elements are configured to be turned off according to the carry signal output from a corresponding stage circuit of the plurality of stage circuits to disconnect the inverted signal line.

13. The display device of claim 12, wherein the display panel is divided into a plurality of display blocks each including one or more pixel rows, and the one or more switching elements are configured to receive the carry signal from a stage circuit connected to a last pixel row of a corresponding display block of the plurality of display blocks.

14. The display device of claim 13, further comprising:

a reset transistor having one electrode connected to a gate-on voltage and a gate electrode configured to receive the gate start signal;

a first node that receives the carry signal from the stage circuit connected to a last pixel row of a first display block;

a control transistor diode-connected between another electrode and the first node of the reset transistor and the first node; and a capacitor connected between the first node and a ground voltage, wherein the one or more switching elements are configured as a first switching element having a source electrode and a drain electrode connected to the inverted signal line between a first dummy pixel group and a second dummy pixel group and a gate electrode connected to the first node.

15. The display device of claim 14, wherein the first switching element is turned on in response to the gate-on voltage applied to the first node through the reset transistor and the control transistor and turned off in response to a carry signal at a gate-off level applied to the first node to electrically separate the second dummy pixel group from the inverted signal line.

16. The display device of claim 1, wherein the inverted signal line has a same material, or a same electrical characteristics, or a same material and electrical characteristics as the control signal line.

* * * * *